(12) United States Patent
Ii et al.

(10) Patent No.: US 7,716,354 B2
(45) Date of Patent: May 11, 2010

(54) CONTROL SYSTEM, DISPLAY DEVICE, CONTROL-USE HOST COMPUTER, AND DATA TRANSMISSION METHOD

(75) Inventors: Nobuhiro Ii, Osaka (JP); Minoru Yoshida, Osaka (JP); Yuichi Morigaki, Osaka (JP); Satoshi Kato, Osaka (JP); Akio Shinohara, Osaka (JP)

(73) Assignee: Digital Electronics Corporation, Osaka (JP)

( * ) Notice: Subject to any disclaimer, the term of this patent is extended or adjusted under 35 U.S.C. 154(b) by 1284 days.

(21) Appl. No.: 11/023,168

(22) Filed: Dec. 28, 2004

(65) Prior Publication Data

US 2005/0114535 A1 May 26, 2005

Related U.S. Application Data

(62) Division of application No. 09/674,175, filed as application No. PCT/JP99/02204 on Apr. 23, 1999, now Pat. No. 6,867,749.

(51) Int. Cl.
*G06F 15/16* (2006.01)
(52) U.S. Cl. .................. 709/230; 709/220; 709/221; 709/222; 709/232; 370/466; 370/468
(58) Field of Classification Search .......... 709/220, 709/221, 222, 230, 232; 370/466, 468
See application file for complete search history.

(56) References Cited

U.S. PATENT DOCUMENTS

| | | | |
|---|---|---|---|
| 4,583,090 A | 4/1986 | Eden et al. | |
| 4,742,475 A | 5/1988 | Kaiser et al. | |
| 5,157,518 A | 10/1992 | Ohtaki et al. | |
| 5,307,346 A * | 4/1994 | Fieldhouse | 370/254 |
| 5,357,625 A | 10/1994 | Arends | |
| 5,374,231 A | 12/1994 | Obrist | |
| 5,455,688 A | 10/1995 | Furukawa et al. | |
| 5,613,100 A | 3/1997 | Anezaki | |
| 5,999,979 A * | 12/1999 | Vellanki et al. | 709/232 |
| 6,029,196 A * | 2/2000 | Lenz | 709/221 |

(Continued)

FOREIGN PATENT DOCUMENTS

DE  44 13 836 A1  10/1995

(Continued)

OTHER PUBLICATIONS

U.S. Appl. No. 11/022,676, filed Dec. 28, 2004, Nobuhiro, Ii, et al., Digital Electronics Corporation.

(Continued)

*Primary Examiner*—Jinsong Hu
(74) *Attorney, Agent, or Firm*—Staas & Halsey LLP

(57) ABSTRACT

A control system including control devices with each control device including a control unit and a display device connected with the control unit via a dedicated communication line and being capable of display corresponding to a control state of the control unit. The display device includes a communication port connected with a control unit and a communication port connected with a data processing device, and a data processing section. Further, the data transmission method includes a dedicated protocol communication transmitting data with a processing device and a common protocol communication transmitting data with another processing device. In addition, the control-host computer used in the control system includes a control unit controlling a control target and a display device.

6 Claims, 21 Drawing Sheets

U.S. PATENT DOCUMENTS

| | | | |
|---|---|---|---|
| 6,256,635 B1 * | 7/2001 | Arrouye et al. | 707/102 |
| 6,426,959 B1 * | 7/2002 | Jacobson et al. | 370/468 |
| 6,516,356 B1 * | 2/2003 | Belknap et al. | 719/328 |
| 2002/0147797 A1 * | 10/2002 | Paul | 709/220 |

FOREIGN PATENT DOCUMENTS

| | | |
|---|---|---|
| EP | 0 449 458 A1 | 10/1991 |
| EP | 0 491 657 A1 | 6/1992 |
| EP | 0 522 590 A1 | 1/1993 |
| JP | 54-95148 | 7/1979 |
| JP | 62186634 | 8/1987 |
| JP | 63-27942 | 2/1988 |
| JP | 63-108407 | 5/1988 |
| JP | 63-217401 | 9/1988 |
| JP | 1-307846 | 12/1989 |
| JP | 03022159 | 1/1991 |
| JP | 03-036602 | 2/1991 |
| JP | 3-36602 | 2/1991 |
| JP | 5-22309 | 1/1993 |
| JP | 05-265952 | 10/1993 |
| JP | 5-304695 | 11/1993 |
| JP | 6-59994 | 3/1994 |
| JP | 6-164673 | 6/1994 |
| JP | 6-164676 | 6/1994 |
| JP | 7-79246 | 3/1995 |
| JP | 7-225831 | 8/1995 |
| JP | 7-248981 | 9/1995 |
| JP | 07-297878 | 11/1995 |
| JP | 8-212112 | 8/1996 |
| JP | 9-81226 | 3/1997 |
| JP | 9-91012 | 4/1997 |
| JP | 9-160610 | 6/1997 |
| JP | 9-237115 | 9/1997 |
| JP | 10-042380 | 2/1998 |
| JP | 10-105214 | 4/1998 |
| JP | 10-224386 | 8/1998 |
| JP | 10-254513 | 9/1998 |

OTHER PUBLICATIONS

Notice of Rejection, Jan. 29, 2002, Japan.
Korean Office Action dated Dec. 12, 2003.
Supplementary Partial European Search Report mailed Oct. 6, 2006, for European patent application No. 99919522.5.
Supplementary European Search Report mailed Feb. 15, 2007 for European patent application No. 99919522.5.
Office Action mailed Mar. 1, 2004 in parent case U.S. Appl. No. 09/674,175.
Notice of Allowance mailed Sep. 30, 2004 in parent case U.S. Appl. No. 09/674,175.
Office Action mailed Dec. 29, 2005 in related case U.S. Appl. No.11/023,189.
Notice of Allowance mailed Apr. 25, 2006 in related case U.S. Appl. No. 11/023,189.

* cited by examiner

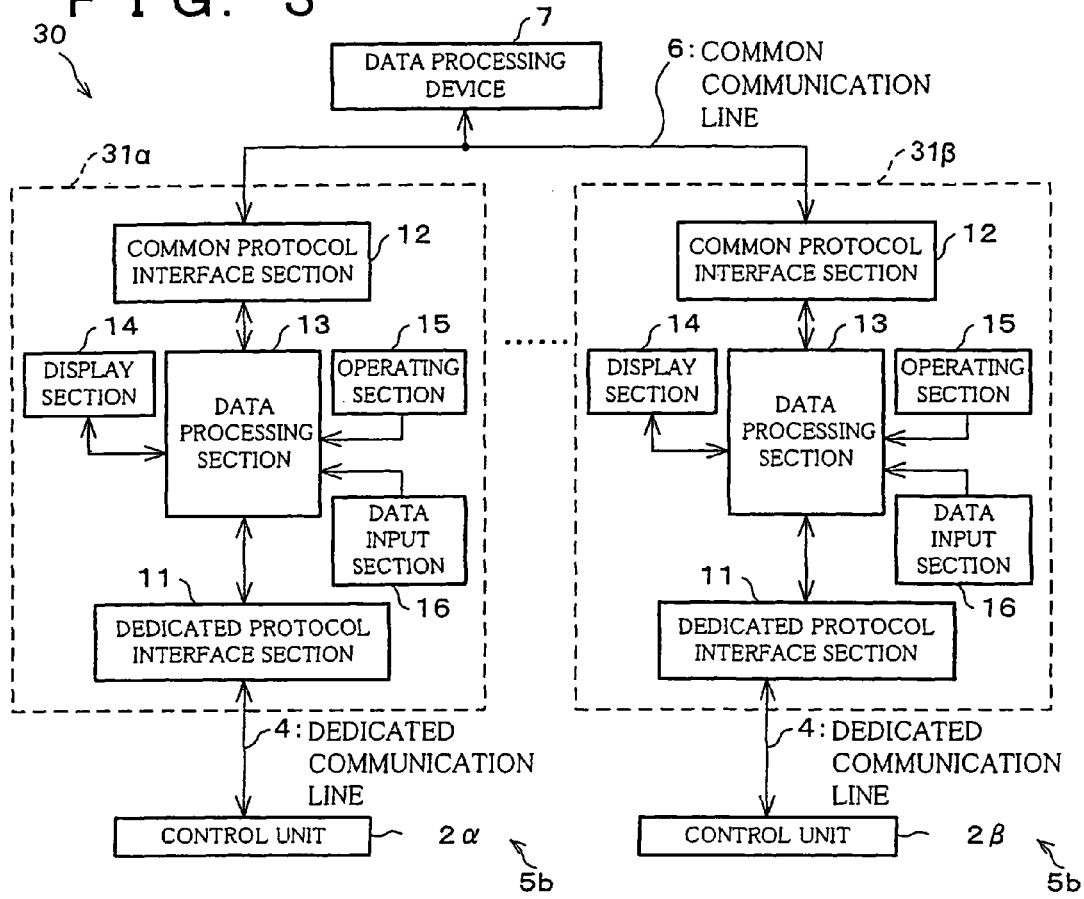
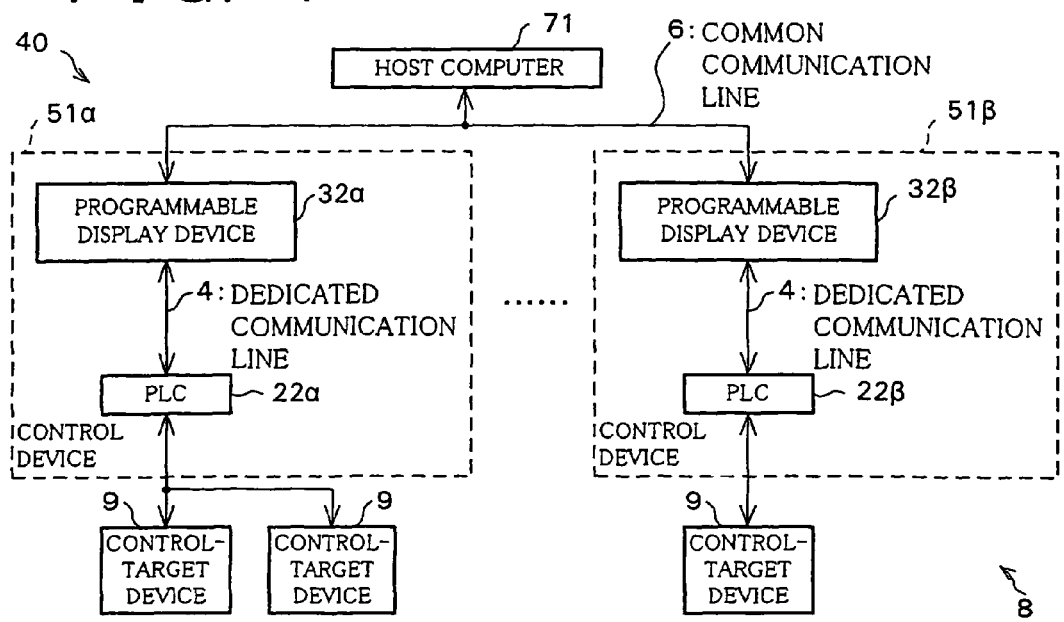

F I G. 1 1
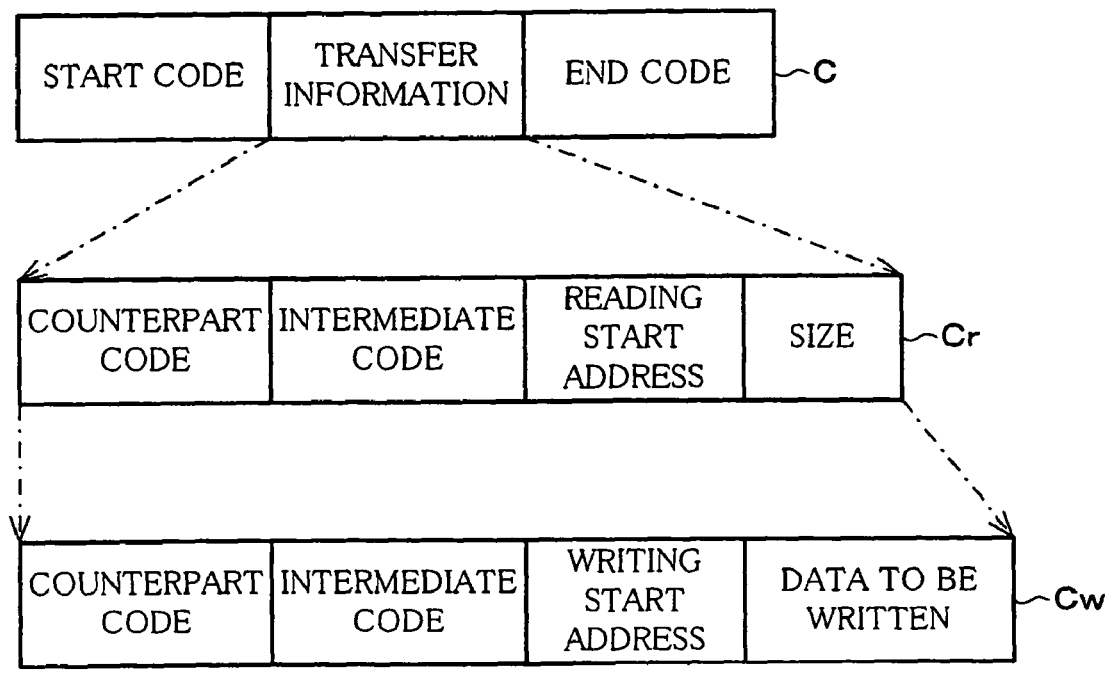

FIG. 16A

| PROTOCOL | RESPONSE CODE |
|---|---|
| α | 10 |
| α2 | 10 |
| β | 20 |
| γ | 30 |

FIG. 16B

| PROTOCOL | RESPONSE CODE |
|---|---|
| α | 01 |
| α2 | 02 |
| β | 01 |
| γ | 01 |

CONTROL SYSTEM, DISPLAY DEVICE, CONTROL-USE HOST COMPUTER, AND DATA TRANSMISSION METHOD

CROSS-REFERENCE TO RELATED APPLICATIONS

This application is a Divisional of application Ser. No. 09/674,175, filed Oct. 27, 2000, now U.S. Pat. No. 6,867,749, and PCT/JP99/02204 filed Apr. 23, 1999, and claims the benefit of Japanese Patent Application 10-117117 filed Apr. 27, 1998, Japanese Patent Application 10-120343 filed Apr. 30, 1998, Japanese Patent Application 10-148801 filed May 29, 1998, Japanese Patent Application 10-232600 filed Aug. 19, 1998, and Japanese Patent Application 10-311039 filed Oct. 30, 1998, the disclosures of which are incorporated herein by reference.

TECHNICAL FIELD

The present invention relates to (i) a control system that has a plurality of control devices each of which includes a method of control e.g., control unit such as a programmable logic controller (hereinafter referred to as PLC) and a display device displaying a control state of the method of control, and that enables transmission between the control means, (ii) a display device for the control system, (iii) a control-use host computer suitably used in a control system, and (iv) a data transmission method regarding data transmission between a first data processing device having its own communication protocol specialized for itself like the foregoing control unit and a second data processing device having a common communication protocol like a personal-computer-applied device.

BACKGROUND OF THE INVENTION

In a conventional control system, generally, a PLC is placed at the center of control, and a plurality of PLCs and host computers are connected via predetermined interface circuits directly or indirectly via dedicated adapters, so that transmission of control data between the PLCs as well as between the PLCs and the host computers is carried out with use of communication functions of the PLCs.

However, developed from a sequencer utilizing a relay, a PLC best performs in operations related with input/output control, such as an ON/OFF control of a switch and an operation of taking in data from a sensor, and use of a PLC as a center of data communication will overload the PLC, even though such use is possible.

Furthermore, data communication time becomes excessively long, for instance, upon an initial setting before control when more data transmission is required, as compared with during control. In a case where a personal computer is directly connected to a display device of a PLC to shorten the data communication time, connection change becomes extremely bothersome.

The following description will explain a typical conventional control device, while referring to FIG. 24 that is a block diagram schematically illustrating an arrangement of the same. A plurality of PLCs (three PLCs in the case of FIG. 24), that is, PLCs $501\alpha$, $501\beta$, and $501\gamma$ are equipped with their dedicated display devices $502\alpha$, $502\beta$, and $502\gamma$, respectively, and are connected with a host computer 504 via a network circuit 503. In response to a control output of the host computer 504, the PLCs $501\alpha$, $501\beta$, and $501\gamma$ control one or a plurality of apparatuses to be controlled (not shown), receive states of the control-target apparatuses from sensors not shown, and cause the display devices $502\alpha$, $502\beta$, and $502\gamma$ to display the states.

The foregoing PLC $501\alpha$, $501\beta$, and $501\gamma$ may use different protocols, as indicated with the reference codes of $\alpha$, $\beta$, and $\gamma$ in FIG. 24, depending on respective manufacturers thereof, or in some cases, from one PLC to another PLC even though made of the same manufacturer. Therefore, the host computer 504 conducts communication with the PLCs $501\alpha$, $501\beta$, and $501\gamma$ via the network circuit 503 according to protocols $\alpha$, $\beta$, and $\gamma$, respectively.

Therefore, the display devices $502\alpha$, $502\beta$, and $502\gamma$ are connected with the corresponding PLCs $501\alpha$, $501\beta$, and $501\gamma$ via connection cables $505\alpha$, $505\beta$, and $505\gamma$, respectively. The display devices $502\alpha$, $502\beta$, and $502\gamma$ synthesize data expressing control states transmitted according to the foregoing protocols $\alpha$, $\beta$, and $\gamma$, respectively, with characters and image data installed beforehand, so as to produce display screens and execute display. More specifically, for example, changeable data such as data expressing the foregoing control states are synthesized with a fixed screen display in which names of the foregoing apparatuses to be controlled are added to a background illustrating a manufacturing line, and a resultant screen display is displayed.

Therefore, the foregoing display screen is changed upon a change of products being produced or a producing method, and also it is changed out upon occurrence of an inconvenience.

As described above, the foregoing PLCs $501\alpha$, $501\beta$, and $501\gamma$ have originally been developed from control-use sequencers using relays, and they excel in ON/OFF control of switches and functions as input/output circuits for taking in data from sensors, whereas they are inferior in data communication functions. Therefore, they are capable of transmitting data like data expressing control states of the apparatuses to be controlled to the display devices $502\alpha$, $502\beta$, and $502\gamma$, but they are not suitable for transmission of enormous data such as character and image data.

Therefore, conventionally, upon changes of the display screen, a personal computer 506 storing the character and image data is taken into the manufacturing site, and the display devices $502\alpha$, $502\beta$, and $502\gamma$ set in walls or manufacturing machines are taken out. After the PLCs $501\alpha$, $501\beta$, and $501\gamma$ are turned into a offline state, disconnected to the network circuit 503, the connection cables $505\alpha$, $505\beta$, and $505\gamma$ connecting the display devices $502\alpha$, $502\beta$, and $502\gamma$ with the PLCs $501\alpha$, $501\beta$, and $501\gamma$ are disconnected from the display, devices $502\alpha$, $502\beta$, and $502\gamma$ (indicated by an arrow code $\phi$ as to the connection cable $505\alpha$). Thereafter, a connection cable 507 extended from the personal computer 506 is connected thereto (indicated by an arrow code A as to the connection cable 507), so that the foregoing character and image data are installed.

Upon an end of the installation of data, connection of the connection cables $505\alpha$, $505\beta$, and $505\gamma$ with the display devices $502\alpha$, $502\beta$, and $502\gamma$ is restored, the display devices $502\alpha$, $502\beta$, and $502\gamma$ are returned to their own places in the walls or manufacturing machines, and the PLCs $501\alpha$, $501\beta$, and $501\gamma$ are returned into an online state, with connection of the same with the network circuit 503 restored.

Therefore, the operation of changing the screen display is complicated, and it is necessary to consecutively connect the personal computer 506 with the display device whose screen display is to be changed, one after another, for downloading. Therefore, there arises a problem that an offline time is prolonged.

Furthermore, transmission of a relatively large amount of data upon, for example, a change of processed products or drastic changes to processing operation data is also executed by connecting the personal computer 506 with the PLCs 501α, 501β, and 501γ and installing preset data such as application programs and initial values, like in the foregoing case of the foregoing characters and image data.

Furthermore, since the PLCs differ in communication protocols for data communication, depending on respective manufacturers thereof, or in some cases from one PLC to another PLC even though produced by the same manufacturer, there are innumerable communication protocols to which a host computer has to be suited, and it is necessary to anew prepare communication protocols that are suited for the PLCs, for dedicated use of the host computer. Thus, there exists a problem of extreme inconvenience.

SUMMARY OF THE INVENTION

The inventors of the present invention examined the foregoing problems, and arrived at the following finding. Namely, having been developed as a personal-computer-applied device, a programmable display device that has been exclusively used for display is capable of data communication with a generally used personal computer without any problem with use of a generally used protocol. Furthermore, a display device is necessarily capable of data communication with a PLC, it is usual that a dedicated communication protocol specialized for a PLC to be connected with the display device has been developed.

Therefore, in the case where this display device is placed at center of communication and each PLC and a host computer are connected to each other with use of display devices, the display devices function as protocol converting means in data communication.

Aspects of the present invention have been made based on this finding, and an object of the present invention is to provide a control system in which a display device that conventionally was used exclusively for display of a control state is placed at a center of data communication. This ensures that a control unit such as a PLC can be exclusively used for I/O control whereby a load on the control unit is decreased. At the same time, it ensures that innumerable communication protocols of control units need not be considered on the side of a data processing device of the host computer or the like or on the display device side, whereby software operations are reduced.

Furthermore, based on the foregoing finding, an object of the present invention is to provide a data transmission method for a system having (i) a first data processing device having its own communication protocol such as the foregoing control unit, and (ii) a second data processing device having a common communication protocol such as a personal-computer-applied device, the data transmission method ensuring normal communication, without causing the second data processing device to consider all innumerable specialized communication protocols upon data transmission between the first and second data processing devices, so that software operations for development, management, and maintenance of the system are reduced.

More specifically, a control system in accordance with an aspect of the present invention is a control system including a plurality of control devices, each control device including a control unit and a display device connected with the control unit via a dedicated communication line and being capable of display corresponding to a control state of the control unit, the control system being capable of transmitting data between the control devices. The control system includes data transmitted between the control unit and the display device according to a dedicated protocol specialized for the control unit, and (ii) all of the display devices in the control devices are connected with each other via a common communication line, and data is transmitted between the display devices according to a common protocol.

Incidentally, protocols in a wide sense include protocols (transmission protocols) that have to be standardized in a network covering a transmitter and a receiver, for, otherwise data per se cannot be transmitted. Such protocols include: codes indicative of a start character, an end character, etc.; transmitting/receiving timings of each character; and methods for identifying the transmitter or the receiver. The protocols also include command systems that have to be standardized between the transmitter and the receiver, for, otherwise, an operation requested by one part and an operation executed by the other part do not coincide, thereby making it impossible to normally execute operations such as control operations. The aforementioned dedicated and common protocols are realized as combination of transmission protocols and command systems.

This allows the control unit to be used in exclusively for I/O control, thereby enabling a reduced load on the control unit. Moreover, since the display device should be at least capable of communication according to a dedicated protocol of a control unit connected thereto and according to the foregoing common protocol, it is possible to decrease the number of steps required for production (development) of software.

In addition to the foregoing arrangement, a data processing device may be connected to the common communication line, and data may be transmitted between the data processing device and each display device according to the foregoing common protocol.

In the foregoing arrangement, the data processing device is communicable with any control device as long as the data processing device can communicate according to the common protocol. Therefore, in spite of the presence of the data processing device, time and labor for development, management, and maintenance of the whole control system can be saved.

Furthermore, a display device according to an aspect of the present invention includes (i) a first data communication port connected with a control unit having a predetermined dedicated communication protocol specialized for the control unit itself, (ii) a second data communication port connected with a certain data processing device, (iii) a data processing section that processes data inputted and outputted through the first and, second data communication ports, in accordance with a procedure set beforehand, and (iv) a display section that provides a display corresponding to information processed by the data processing section, and (a) the display device executes data communication with the control unit according to the dedicated communication protocol of the control unit, and (b) the display device executes data communication with the data processing device according to the common communication protocol.

By using a display device arranged as above, like in the case of the above-described control system, a load on the control unit is reduced, while the number of steps required for production (development) of software is decreased.

Furthermore, in addition to the foregoing arrangement, the display device may be arranged so that the data processing section is also connected with an operating section, so that a timing of data processing and contents of the processing by the data processing section is manually instructed by means of the operating section. This arrangement allows the display device to be used as operating means of the control system.

Furthermore, a display device arranged as described above may be further arranged so as to further include a data input section for downloading, from outside the device, data for communication according to the dedicated communication protocol.

The foregoing arrangement ensures communication with the control unit by downloading programs for communication, data indicative of a communication format, and other necessary data for a dedicated protocol, without preparing in the display device beforehand all data that allows communication according to any one of all dedicated protocols likely connected with the display device.

Furthermore, a display device arranged as described above is further arranged so as to further include a conversion table storing section that stores a conversion table showing correspondence between special information of the control unit that is extracted from the dedicated protocol on one hand and common information transmitted according to the common protocol on the other hand, so that the data processing section converts the common information received from the common communication line, into the special information, referring to the conversion table.

According to the foregoing arrangement, a program for communication is not prepared for each control unit, but rather a conversion table is prepared for each control unit. Therefore, by only changing the conversion table, communication according to each dedicated protocol is enabled.

Furthermore, in addition to the foregoing arrangement, the display device is further arranged to include a format information storing section for storing a data transfer format of transfer information transmitted according to the dedicated protocol, so that the data processing section produces the transfer information by substituting the converted special information for an undefined portion of the data transfer format.

According to the foregoing arrangement, the display device applies necessary data to undefined portions of the data transfer format and produces a command to be transferred with a specific control unit at real time during an operation of the control system. Therefore, irrespective of where data inputted come from, transmission of data is enabled. Furthermore, even when a control unit to which the data should be transmitted is changed, necessary actions can be taken without stopping the system.

Furthermore, a display device arranged as described above is further arranged so as to include a protocol determining section that (a) sends out preset data according to a communication protocol selected from among a group of protocols applicable for communication of itself, prior to data transmission with the control unit, and that (b) in the case where a response from the control unit coincides with a predetermined response, determines the communication protocol as a communication protocol used for the data transmission with the control unit.

According to the foregoing arrangement, the dedicated protocol that the display device uses for data transmission is determined prior to establishment of data transmission with the control unit. This enables reduction of time and labor spent by the user, and also prevents errors in setting, as compared with the case where the user sets the dedicated protocol.

On the other hand, a data transmission method in accordance with an aspect of the present invention is a data transmission method applied when a data processing device transmits data with a first data processing device and a second data processing device, the data processing device being provided between the first data processing device and the second data processing device, the first data processing device transmitting data according to a first communication protocol, and the second data processing device transmitting data according to a second communication protocol. The method includes (i) a dedicated protocol communication operation of transmitting data with the first data processing device according to a communication protocol specialized for the first data processing device, and (ii) a common protocol communication operation of transmitting data with the second data processing device according to a communication protocol common to data processing devices that are likely connected with the data processing device.

According to the foregoing arrangement, each data processing device is capable of communication only according to a dedicated protocol of the first data processing device connected thereto and according to the common protocol. Therefore, as is the case with the foregoing control system, it is possible to decrease the number of operations required for production (development) of software.

Furthermore, a data transmission method in accordance with an aspect of the present invention is a data transmission method applied when a data processing device transmits data with a first data processing device and a second data processing device, the data processing device being provided between the first data processing device and the second data processing device, the first data processing device transmitting data according to a first communication protocol, and the second data processing device transmitting data according to a second communication protocol. The method includes (i) a dedicated protocol communication step of transmitting data with the first data processing device according to a communication protocol specialized for the first data processing device, and (ii) a data sending operation of, prior to the dedicated protocol communication operation, selecting a communication protocol from among a group of protocols possessed by itself and sending out preset data according to the selected communication protocol, and (iii) a protocol determining operation of waiting for a response from the first data processing device, and determining a communication protocol to which a predetermined response is obtained as a communication protocol used for data transmission with the first data processing device.

According to the foregoing arrangement, the data sending operation and the communication protocol determining operation are performed before the dedicated protocol communication operation. This enables reduction of time and labor spent by the user, and also prevents errors in setting, as compared with the case where the user sets the dedicated protocol.

On the other hand, a control-use host computer in accordance with an aspect of the present invention is a control-use host computer used in a control system that includes (a) a control unit for controlling a control target, (b) a display device that communicates with the control unit via a dedicated network so as to display or control a control state of the control unit and that, in the case where a common network apart from the dedicated network has a communication protocol different from that of the dedicated network, converts one of the protocols into the other protocol, and (c) the control-use host computer connected with the display device via the common network. The control-use host computer includes an interface section that sends data streams containing instruction contents for the control unit via the common network to the display device connected with the control unit.

According to the foregoing arrangement, the interface section of the control-use host computer gives the display control device information of instruction contents to the display device via the common network, and the display control device of the control system converts the communication protocol so as to transfer the information to the control device. Therefore, the interface section of the control system communicates with the common network according to one communication protocol irrespective of the communication protocol of the control device. Consequently, this allows control devices with different communication protocols to exist together in the control system, and therefore, saving time and labor in incorporating a control device into the control system.

Furthermore, since the communication protocol of the interface section is uniform irrespective of the communication protocol of the control device, there is no need to change the interface section and the transmission control means of the control-use host computer, even in a case where a new control device is developed. Therefore, as compared with the conventional cases where when a new control device is incorporated a program for a communication protocol of the new control device is created on both the sides of the display control device and the control-use host computer, time and labor required upon incorporation of the control device into the control system is saved for the time and labor required relating to the control-use host computer, and time and labor required for management and maintenance of the whole control system is saved.

Furthermore, in addition to the foregoing arrangement, the control-use host computer according to an aspect of the present invention is arranged so as to further include a plurality of transmission control sections that are provided between the interface section and a host-side display section for controlling or displaying a state of the control target and that controls the interface section in response to a request from the host-side display section, so as to transmit or receive data for controlling or displaying the state of the control target, wherein one of the transmission control sections is a simple transmission control section that is capable of specifying the request through a simpler procedure than the other transmission control section does.

According to the foregoing arrangement, since at least one of the transmission control sections is a simple transmission control section, the developer on the host-side control section is allowed to send a request regarding a degree of difficulty according to his/her own expertise, by selecting the simple transmission control section or the other transmission control section. Furthermore, the developer of the transmission control section is allowed to recommend which transmission control section should be used, considering expertise of the developer of the host-side display control section. Consequently, it is possible to prevent errors of the control system caused by a mistake of the developer of the host-side display control section.

Furthermore, a control system in accordance with an aspect of the present invention is a control system in which a control device controls a control target in response to a control output transmitted from a host device, and transmits information about the control to a display device so that the information is synthesized and displayed with character and image data installed beforehand in the display device. The control system includes a display device between the host device and the control unit, so that the character and image data are downloaded from the host device so as to be installed in the display device.

According to the foregoing arrangement, noting that a display device dealing with data of a relatively larger amount such as image data has a higher computing competence and higher applicability to data communication as compared with a control unit dealing with data of a relatively smaller amount such as ON/OFF data, this display device is provided between the host device such as a host computer and the control unit such as a programmable logic controller, and a control output from the host device or control state data from the control unit is transmitted without any trouble via the display device to the control unit or to the host device, respectively. On the other hand, upon installing character and image data that are produced by writing names of control-target devices on a background screen illustrating, for example, manufacturing lines, the data is transmitted directly to the display device via a normal communication circuit. Therefore, there is no need to carry out complex operations such as taking the host device into a manufacturing site, changing the wire connection, and the like. Moreover, in the case where a plurality of display devices, that is, control units are connected via a network circuit, character and image data can be transmitted to the display devices successively, whereby the installing operation can be completed within a short time.

Furthermore, a control system in accordance with an aspect of the present invention is a control system in which a plurality of control units respectively control targets in response to control outputs transmitted from a host device, and information about the controls is displayed in corresponding display devices, respectively. The control system includes a display device between the host device and the control unit, so that preset data are downloaded from the host device so as to be installed in the display device.

According to the foregoing arrangement, like in the case where character and image data are installed, the display devices transfer data to the control units and the host computer, respectively, thereby providing transmission of data without problems. Furthermore, upon installing preset data such as application programs and initial values not only to the display devices but also to the control units, it is possible to directly transmit the data via normal communication lines. This ensures a reduction of work upon installation, while also ensuring that the installing operation is completed within a short time even in a case where a plurality of display devices, that is, control units are connected.

Furthermore, the control system that enables installation of character and image data or preset data from the host device is according to an aspect of the present invention arranged so that communication between the control unit and the display device corresponding thereto is carried out according to a certain protocol, while communication via a network circuit between the display device and the host device should be carried out according to the predetermined common protocol.

According to the foregoing arrangement, taking advantage that each control unit is connected with the host device via the display device that has a high computing competence and high applicability to data communication, the display device provides protocol conversion. In so doing, the control unit is allowed to use an arbitrary protocol that differs depending on the manufacturer or the product, while the network is made to use the predetermined common protocol, and consequently, extension or change of the control system easily executed.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a block diagram illustrating a structure of a principal part of a control system of still another embodiment of the present invention.

FIG. 4 is a block diagram illustrating a network structure of a control system of still another embodiment of the present invention.

FIG. 11 is an explanatory view illustrating an example of a data transfer format used in a common protocol in the foregoing control system.

FIGS. 16A through 16B are explanatory views illustrating an example of tables of correspondence between dedicated protocols and response codes in the case where a protocol-identification command is sent out by the foregoing control system.

DETAILED DESCRIPTION OF THE INVENTION

The following description will explain the aspects of the present invention, referring to examples of the present invention and comparative examples. Note that however the aspects of the present invention are not limited by the examples at all.

[First Aspect]

Figure 1:
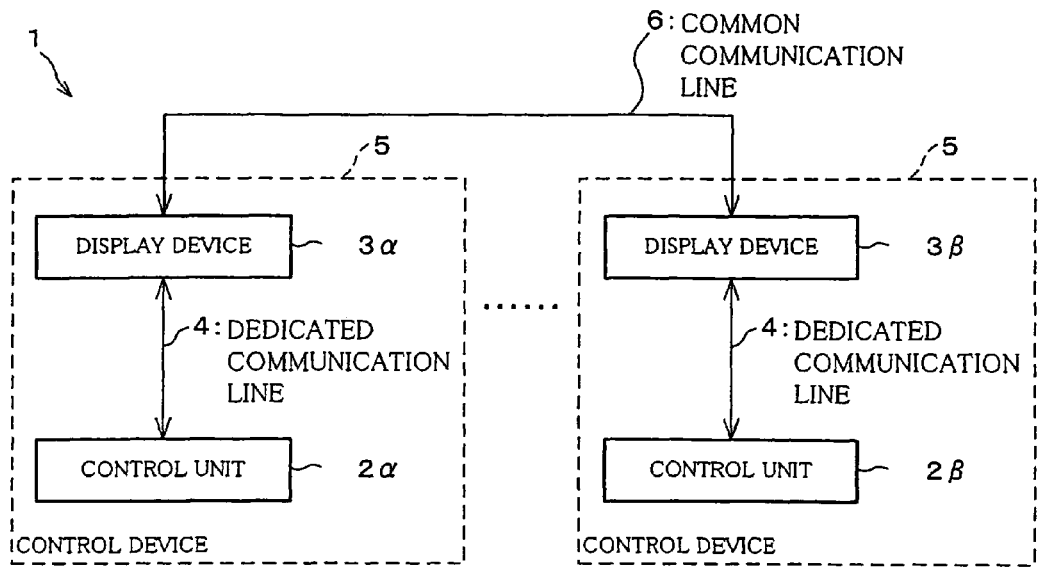
FIG. 1 is a block diagram illustrating a structure of a principal part of a control system illustrating an embodiment of the present invention.

The following description will explain an aspect of the present invention while referring to FIG. 1. As shown in FIG. 1 that schematically illustrates an overall structure of a control system 1 in accordance with the aspect of the present invention, the control system 1 is provided with a plurality of control devices 5 each of which includes a control unit $2\alpha$, $2\beta$, a display device $3\alpha$, $3\beta$ capable of display suitable to a controlled state of the control unit $2\alpha$, $2\beta$ and a dedicated communication line 4 for connection between the control unit $2\alpha$, $2\beta$ and the display device $3\alpha$, $3\beta$ so that data can be transferred between the control devices 5. In each control device 5, the control unit $2\alpha$, $2\beta$ and the display device $3\alpha$, $3\beta$ execute data communication by means of a dedicated protocol inherently specialized for each control unit $2\alpha$, $2\beta$. On the other hand, the display devices of the control devices 5 are connected with each other via a common communication line 6, and execute data communication by means of a common protocol.

In the foregoing arrangement, the display devices $3\alpha$, $3\beta$ execute protocol conversion thereby enabling each control device 5 to communicate each other by means of a common protocol predetermined. Therefore, even in the case where the dedicated protocols of the control units $2\alpha$, $2\beta$ are different from each other, transfer of data between the control devices 5 is enabled without any difficulties. As a result, control units $2\alpha$, $2\beta$ using different communication protocols are allowed to exist in one control system, without problems.

Furthermore, the display devices $3\alpha$, $3\beta$ that have been used exclusively for display of control states are now used as center of data communication, and the display devices $3\alpha$, $3\beta$ execute protocol conversion between a dedicated protocol and a common protocol. Therefore, it becomes possible to use the control units $2\alpha$, $2\beta$ exclusively for I/O control which is its own function, thereby enabling to reduce a load on the control units $2\alpha$, $2\beta$.

Furthermore, if the display device $3\alpha$ is capable of protocol conversion between a dedicated protocol for the control unit $2\alpha$ connected with the display device $3\alpha$ and the foregoing common protocol, data transfer is enabled between the foregoing control unit $2\alpha$ and a control unit $2\beta$ via a display device $3\beta$ that corresponds to the control unit $2\alpha$, irrespective of the dedicated protocol of the control unit $2\beta$. Therefore, communication protocols specific to the control units $2\alpha$, $2\beta$ that are innumerable need not be considered, while only communication by means of a dedicated protocol of a control unit that can possibly be connected thereto, communication by means of the common protocol, and the protocol conversion between the two may be taken into consideration. Therefore, operations required in production (development) of software can be decreased.

Additionally, even in the case where a control device including a control unit 2β that communicates with a new dedicated protocol is added in the control system 1, there is no need to alter another display device. Therefore, time and labor upon incorporating the control unit in the control system is saved, whereby time and labor for management and maintenance of the whole control system is saved.

[Second Aspect]

Figure 2:
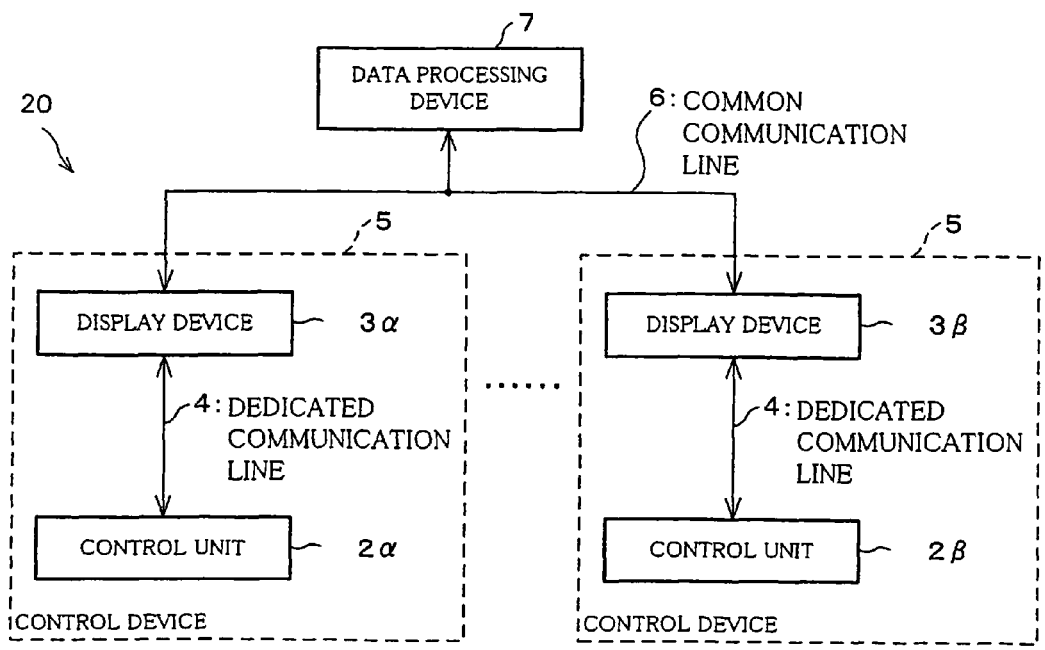
FIG. 2 is a block diagram illustrating a structure of a principal part of a control system of another embodiment of the present invention.

A control system 20 in accordance with an aspect of the present, as shown in FIG. 2, includes a data processing device 7 connected with a common communication line 6, to ensure transfer of data between the data processing device 7 and the display devices 3α, 3β using the common protocol. This enables various operations such as centralized control by the host computer, and download of a protocol conversion procedure that will be described later.

In this arrangement as well, like in the foregoing control system 1, the data processing device 7 is capable of transfer of data to and from each control device 5 by communication using the common protocol alone. As a result, the data processing device 7 need not produce different sets of software for dedicated protocols respectively, and therefore, time and labor necessary for production of software can be reduced. Furthermore, even in the case where a new control device 5 is incorporated in the control system 20, there is no need to alter the data processing device 7. Consequently, in spite of the provision of the data processing device 7 communicable with a certain control device 5, time and labor for development, management, and maintenance of the whole control system 20 can be saved.

[Third Aspect]

The following description of an aspect of the present invention will explain in more detail an arrangement of a display device while referring to FIG. 3.

Display devices 31α, 31β of a control system 30 in accordance with an aspect of the present invention include a dedicated protocol interface section (first data communication port) 11, a common protocol interface section (second data communication port) 12, a data processing section 13, and a display section 14. The dedicated protocol interface section 11 is connected, via a dedicated communication line 4, with a control units 2α, 2β in which a dedicated protocol specific to the control units 2α, 2β is specified beforehand. The common protocol interface section 12 is connected with a certain data processing device such as a data processing device 7 or another display device 31α, 31β, via a common communication line 6 for communication using a predetermined common protocol. The data processing section 13 processes data inputted/outputted via the protocol interface sections 11 and 12 according to a procedure set beforehand. The display section 14 executes display corresponding to information processed by the data processing section 13.

Furthermore, for example, the protocol interface sections 11 and 12 execute communication using their own communication protocols, respectively, while a data format is converted by the data processing section 13 as required; consequently, data communication between the dedicated protocol interface 11 and the control unit 2α, 2β is executed using the dedicated protocol, and data communication between the common protocol interface section 12 and the data processing device 7 (another display device 31α, 31β) is executed using the common protocol.

Furthermore, the data processing section 13 is connected with an operating section 15 accepting an input from a user, such as a touch panel or a keyboard, so that instruction of data processing times and processing contents of the data processing section 13 can be inputted manually via the operating section 15.

Additionally, the display device 31α, 31β in accordance with an aspect of the present invention is equipped with a data input section 16 for input of data from outside the display device 31α, 31β, such as a memory card reader, so that data and programs for processing the foregoing dedicated protocols (data for dedicated protocols) can be downloaded from outside the display device 31α, 31β. Incidentally, using the foregoing common protocol interface section 12 as the data input section 16, the foregoing data or programs may be downloaded from the data processing device 7 or another display device 3β, for example.

The foregoing arrangement enables the display device 31α, 31β to, even after being completely fabricated, download data for its dedicated protocol when necessary. Therefore, data for dedicated protocols need not be prepared beforehand as to all the control units 2α, 2β that are connectable, and consequently, a memory capacity required for the display device 31α, 31β is reduced. Furthermore, even in the case where a control unit 2 of a new dedicated protocol is developed, the display device has to only download data for the dedicated protocol so as to communicate with the foregoing control unit. Furthermore, the data for the dedicated protocol may be managed by, for example, the data processing device 7 and downloaded as required. Therefore, management of the data is also facilitated.

[Fourth Aspect]

The following description of an aspect of the present invention will explain in more detail an arrangement of the control device, while referring to FIGS. 4 through 9. Specifically, as shown in FIG. 4, a control system 40 in accordance with an aspect of the present invention is a system provided with a plurality of PLCs 22α, 22β as control units associated with each other, so that the system is capable of sequence control of a target system 8 such as a belt-conveyer-type automatic assembly system. In the control system 40, a programmable display device 32α, 32β is used as a control panel of each PLC 22α, 2β. Furthermore, the control system 40 includes a host computer 71 for centralized control of the control devices 5c and for managing data of the control devices 51α, 51β all together. The programmable display devices 32α, 32β connected with the forgoing PLCs 22α, 22β constitute a set of a control devices 51α, 51β. The control system 40 includes two control devices 51α, 51β including a first control device 51α and a second control device 51α, respectively, or alternatively it may include more than two of such control devices. In the following explanation, for convenience, Greek characters for distinguishing the sets of the control devices 51α, 51β are attached to ends of referential codes like PLC 22α, 22β in the case where the respective sets are individually referred to.

In the present aspect of the invention, two types of the PLCs are used, PLC 22α and PLC 22β. Each of the PLCs 22α and 22β has its own dedicated communication protocol specialized for the manufacturer and the type of the apparatus. PLC 22α and the PLC 22β are capable of executing controls associated with each other as will be described later, in a state of, for example, being individually connected with control-target devices 9 that are individually provided a belt conveyer.

In the following explanation, for convenience, a case where two PLCs and two programmable display device are provided is taken as an example, but according to an aspect of the present invention this number can be increased to three or more, respectively. Furthermore, apart from the PLC, any one of various personal-computer-applied apparatuses may be used as the control unit.

In the PLC 22α, 22β, like a CPU unit or a memory unit, a circuit is formed into a unit for each individual circuit required, and by appropriately adding a unit as required via a bus line, functions achieved by the PLC 2c as a whole can be increased/decreased.

Figure 5:
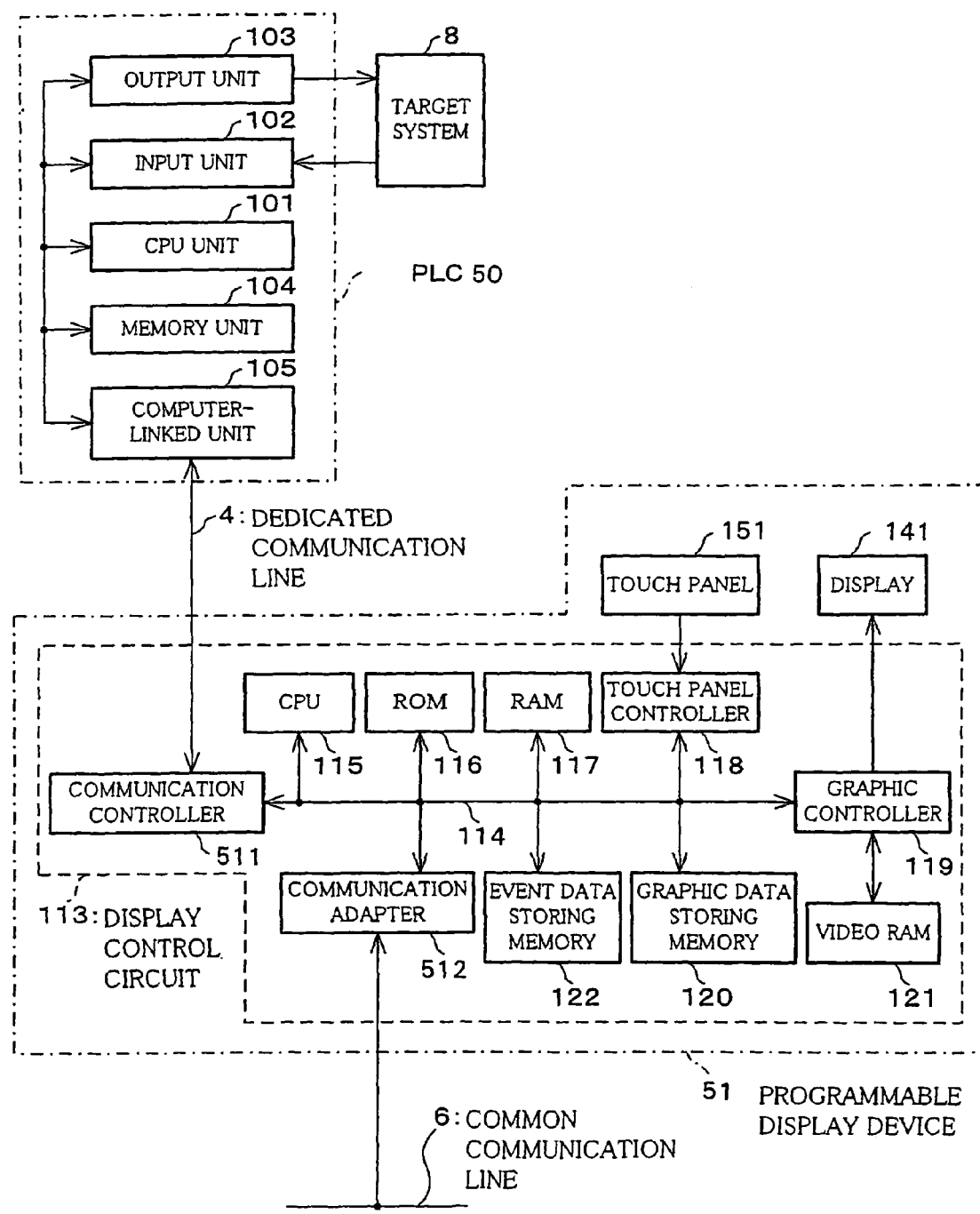
FIG. 5 is a block diagram illustrating an example of an arrangement of hardware of a PLC and a programmable display device in the foregoing control system.

The PLC 50 shown in FIG. 5 includes a CPU unit 101 for controlling the PLC 50, an input unit 102 enabling direct input of a detected signal sent from the target system 8 an output unit 103 enabling output of a processing operation control signal to the target system 8 a memory unit 104 for storing various kinds of data and a computer-linked unit 105 enabling predetermined data communication with the programmable display device 3c. The foregoing CPU unit 101 observes changing states of the input, output, and computer-linked units 102, 103, and 105. Upon recognition of changes in data such as input of new data, after applying necessary calculating operations thereto the CPU unit 101 makes access to a corresponding address on the memory unit 104 to rewrite contents and send data to the output unit 103.

Here, in the memory unit 104, a place for storing state data MD that are inputted/outputted directly to/from the target system 8 or used for control of the target system 8 is provided as to each control-target device 9 to be controlled or displayed, such as a passive member like a level meter or a limit switch provided on the target system 8, an active member like a relay or a motor, or a data setting member such as a counter or an inker. Further, a word device is appropriated to data to be inputted/outputted, in the case where the data are word data such as numerical values, while a bit device is appropriated for bit data such as on/off information. Each device has its own device name such as "X000," and by designating a device name, a place where the data is to be stored is specified on the memory unit 104. Therefore, only by specifying and accessing a certain word or bit device in the memory unit 104 from inside or outside the PLC 50, a corresponding part of the target system 8 can be controlled, or information relating to an operation state of the corresponding part can be individually taken out.

Incidentally, a PLC has according to an aspect of the present invention includes a passive data transmission function, like receiving a command sent from another data processing device such as the programmable display device, and executes writing/reading of data corresponding to the command to/from the memory unit 104, or returning a command or data sent thereto without applying changes thereto, but needless to say, a substantially identical embodiment can be achieved in the case where the PLC has an active data transmission function.

On the other hand, the programmable display device 51 is, along with the foregoing PLC 50, incorporated in an operation table of the target system 8, or alternatively it is independently provided, so as to be used as a control panel for the target system 8.

Figure 6:
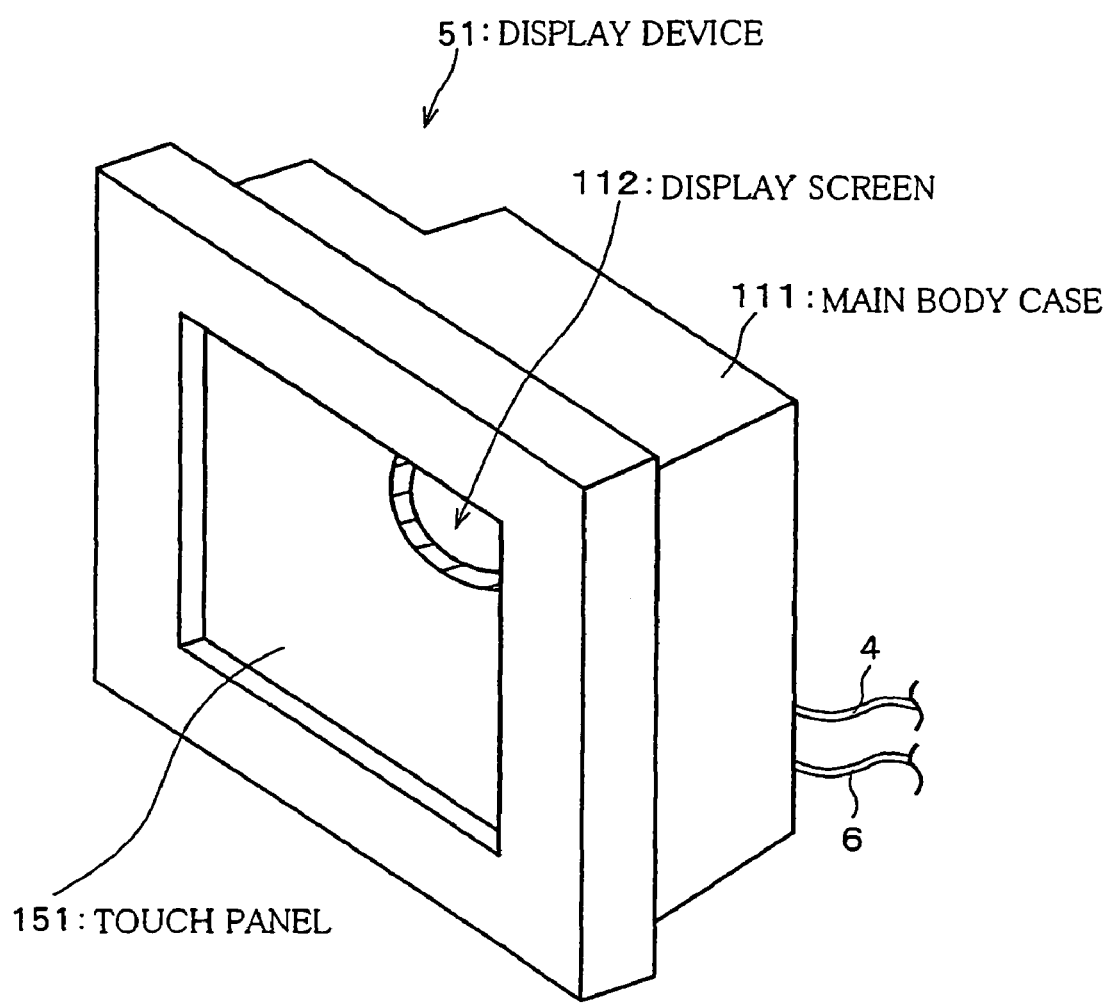
FIG. 6 is a perspective view of an example of an outward, partially cut-away appearance of the programmable display device.

A programmable display device 51 in accordance with an aspect of the present invention is, as shown in FIG. 6 for example, arranged so that a display screen 112 of a display 141 as the foregoing display section 14 is provided on a front side of a main body case 111 formed in a substantially rectangular shape, and a touch panel 151 as the foregoing operating section 15 is provided so as to closely adhere to the display screen. On the other hand inside the main body case 111, a display control circuit 113 shown in FIG. 5 is housed. According to an aspect of the present invention, a liquid crystal display panel is used as the foregoing display 141.

Furthermore, needless to say, any one of various manual operating devices such as a pointing device like a mouse or a key board may be used instead of, or in addition to, the touch panel 151.

A basic hardware arrangement of the foregoing display control circuit 113 is connected as shown in FIG. 5 via a bus line 114 with a CPU 115 and memories, e.g., a ROM 116, and a RAM 117, a touch panel controller 118 for controlling the foregoing touch panel 151, and a graphic controller 119 for controlling the foregoing display 141. The CPU 115 executes a predetermined calculating operation in accordance with a system program stored in the ROM 116. Results of calculations appropriately stored in the RAM 117 are developed into bit images on a video RAM 121 by the graphic controller 119 using various display data stored beforehand in a graphic data storing memory 120 including font data for display of characters and still picture data. Then, contents corresponding to the contents written in the video RAM 121 are displayed on the display screen 112 of the display 141.

Furthermore, the foregoing bus line 114 is connected to a communication controller 511 as the dedicated protocol interface section 11 that is actuated with a dedicated protocol specialized for the circuit arrangement of the PLC, so as to establish communication with the computer-linked unit 105 of the foregoing PLC via a dedicated communication line 4 in parallel or in serial.

On the other hand, the foregoing bus line 114 is connected to a generally used communication adapter 512 such as Ethernet (trademark: Xerox Corp.) as the common protocol interface section 12, so that, for example, connection with the host computer or another programmable display device is provided via the common communication line 6 composed of communication cables, whereby a local area network (LAN) is formed. In the foregoing LAN, a generally used communication protocol (common protocol) such as TCP/IP is used, so as to enable transfer of various kinds of data between the host computer and each control device, or between the control devices.

Furthermore, an example of data transfer between the PLC and the programmable display device in the control system in accordance with an aspect of the present invention is as follows: state data storing memories 17 and 32 that will be described later are provided in the programmable display device and the PLC, respectively, and they transfer data with each other so as to possess the same contents. By so doing, the PLC and the programmable display device are allowed to hold state data of substantially identical contents including the bit device or word device provided on the PLC side, with a minimum time lag. Incidentally, for instance, the state data storing memory 17 is set as one region on the RAM 117 on the programmable display device, while the state data storing memory 32 is set as one region on the memory unit 104.

Figure 7A:
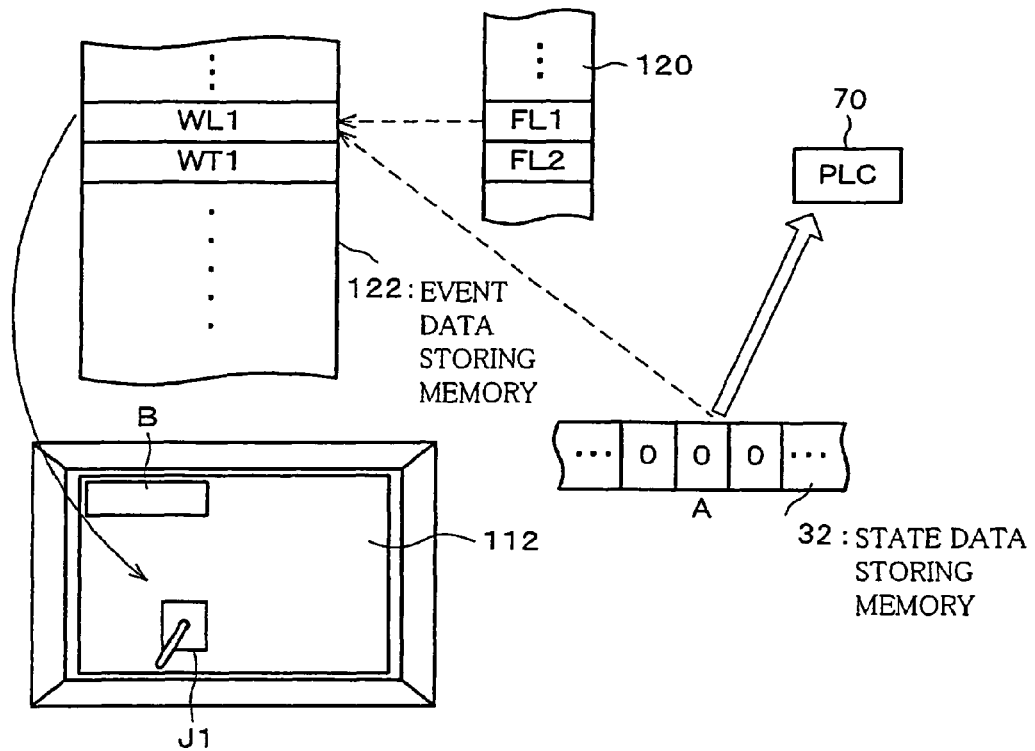
FIGS. 7A and 7B are explanatory views illustrating an example of control operations of the foregoing control system.

Here, the programmable display device, as shown in FIG. 7(a), manages a screen in which one or a plurality of still pictures B or member pictures J1 is placed on a base screen, as a unit screen. The foregoing still picture B is a picture such as name plate whose display contents are not to be changed, while the foregoing member picture J1 is a picture with changes in shape or color or flickering, such as a picture of a switch. Furthermore, the programmable display device includes a plurality of unit screens for use of data processing, as well as it is arranged so that file numbers F e.g., FL1, FL2 . . . are respectively allocated to unit screens, and that a screen displaying required operation contents can be obtained only by switching unit screens by designating a file number F.

Figure 8A:
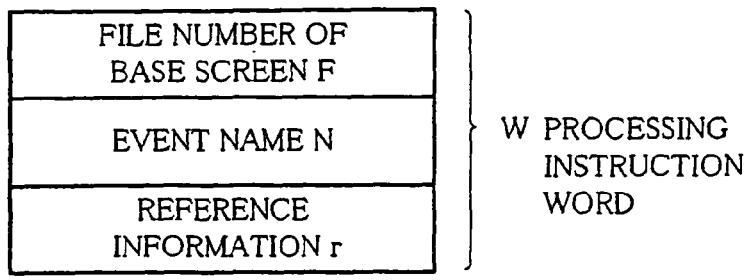
FIGS. 8A through 8C are explanatory views illustrating an arrangement of a processing instruction word used in the foregoing control system.

More specifically, in the foregoing programmable display device, as shown in FIG. 5, an event data storing memory 122 that stores processing instruction words corresponding to the unit screens, respectively, is connected with the bus line 114. When one unit screen is selected, a processing instruction word W, e.g., WL1, WL2, . . . related to the selected unit screen is read intermittently at extremely short intervals. Such a processing instruction word W includes a set composed of a file number F, an event name N, and a reference information r, as shown in FIG. 8A: the file number F is indicative of a base screen to which a display control operation is to be applied the event name N specifies an operation content to be executed on the base screen and the reference information r is composed of one or a plurality of pieces of data that are referred to as to each event to be executed. The programmable display device executes operations of the contents identified by the event names N of the processing instruction word W successively, while referring to the data in the foregoing state data storing memory 17 having identical contents of the state data storing memory 32 of the PLC 70. By so doing, the member picture J1, display data, and the like on the base screen are displayed immediately in accordance with changes to the contents of the bit device or the word device of the PLC 70c.

Figure 8B:
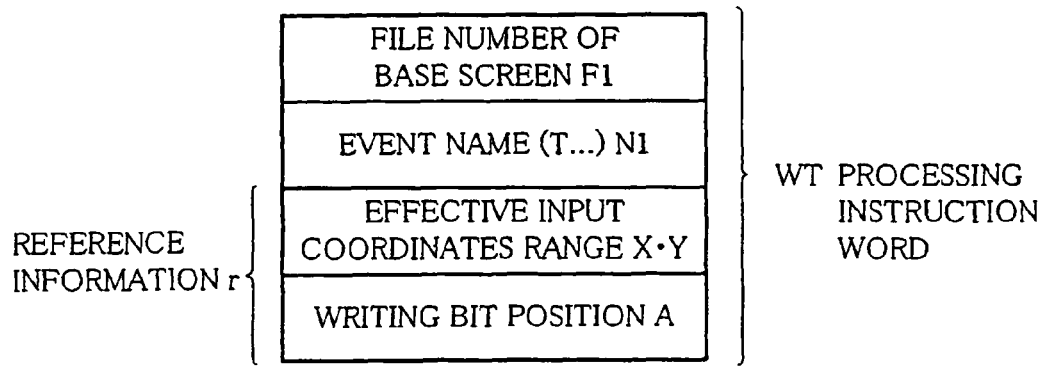

For instance, the processing instruction word WT that is to enable to invert the bit device set at a predetermined address position in the state data storing memory 32 in association of pressing instruction operations with respect to the touch panel 151 is as follows: as shown in; FIG. 8B, the processing instruction word WT includes a file number F1 of the base screen, and an event name N1 specifying an operation of the touch panel 151 that starts with, for example, "T", and further include as the reference information r an input coordinates range X·Y making an input operation through the touch panel 151 valid and an address A at which data should be rewritten in association with pressing operations at the touch panel 151.

Figure 8C:
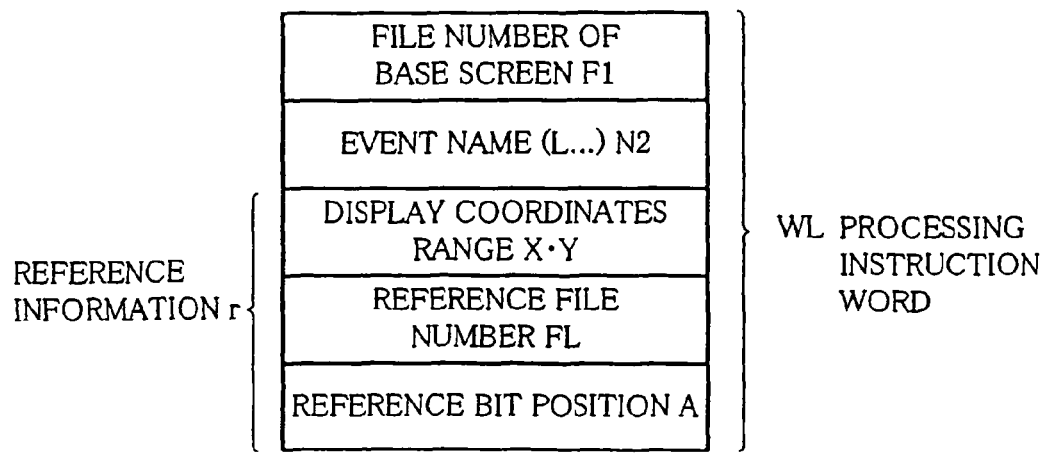

Furthermore, the processing instruction word WL that is to enable to display a predetermined picture at a corresponding position on the base screen in association with operations at the touch panel 151 is as follows: as shown in FIG. 8C, the processing instruction word WL includes a file number F1 of the base screen, and an event name N2 specifying display of a member picture J1 that starts with, for example, "L", and further includes as the reference information r a member picture display coordinates range X·Y, a file number FL specifying a member picture to be recalled, and an address A to be referred to upon display of a member picture.

Furthermore, as shown in FIG. 7A, upon setting processing instruction words WL1 and WTI in the event data storing memory 122, the words WL1 and WTI are set so that respective coordinates ranges X·Y of the words WL1 and WTI coincide with each other, and that the respective reference addresses A thereof coincide with each other. Furthermore, a state of "0" of a bit device at the address A in the state data storing memory 17 is made to correspond to an OFF state of a switch beforehand, so that the PLC 70 executes an OFF operation with respect to the actual switch setting at the time to be controlled, when the bit device exhibits a state of "0". Furthermore, in the graphic data storing memory 119, data indicative of a member picture J1 corresponding to an OFF state of the switch are stored in association with a reference file number FL1, and data indicative of a member picture J2 corresponding to an ON state thereof are stored in association with a reference file number FL2.

Here, as shown in FIG. 7A, in the case where a reference address A of the state data storing memory 17 is "0", a programmable display device reads data indicative of the member picture corresponding to the OFF state of the switch, from the reference file numbered as FL1 of the graphic data storing memory 120 based on the processing instruction word WL1, and develops and displays the read data in the coordinates range X·Y on the base screen.

Upon pressing the switch-like member picture J1 on the touch panel, the programmable display device searches for a touch-panel-use processing instruction word WT in the event data storing memory 122, and judges, based on a coordinates instructed by the touch panel, whether or not exists the processing instruction word WT including as coordinates information a range including the foregoing coordinates.

Figure 7B:
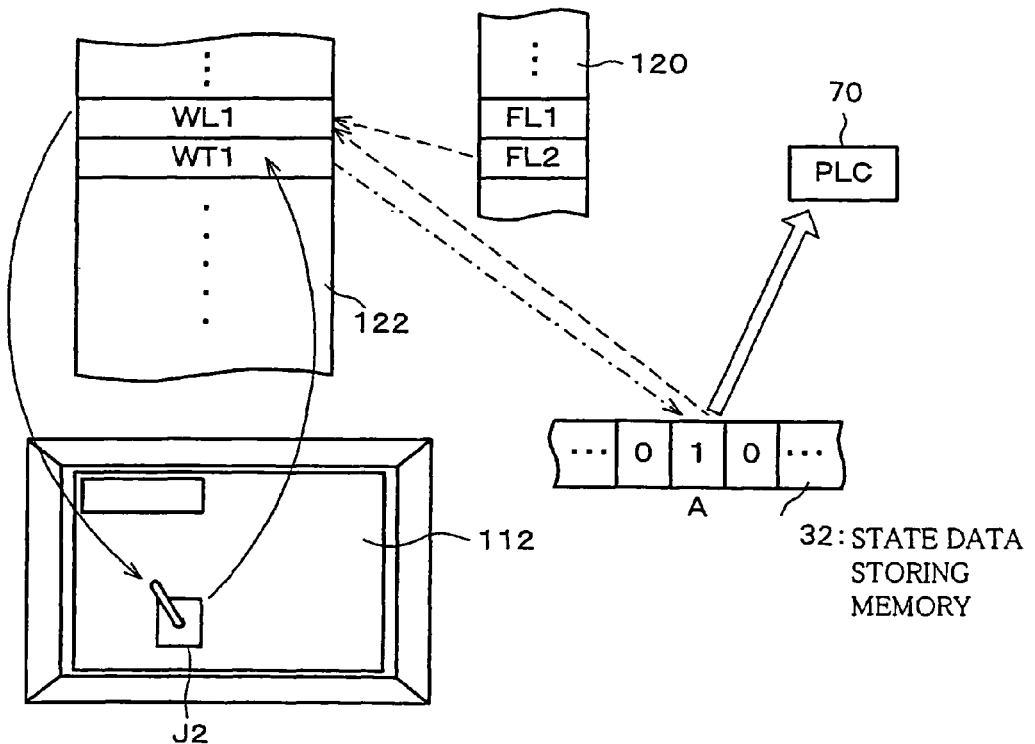

For instance, when a point in the coordinates range X·Y of the processing instruction word WT1 is pressed, the programmable display device finds the processing instruction word WTI and inverts the data value at the corresponding address A from "0" shown in FIG. 7A to "1" shown in FIG. 7B. Consequently, the PLC 2c executes a controlling operation that turns on a switch point corresponding to the address A. Further, since the value of the address A is turned to "1", the member picture J2 illustrating the ON state is read from the reference file numbered "FL2" in the graphic data storing memory 120 based on the processing instruction word WL1, and is displayed in the coordinates range X.Y. Thus, the switch-like member picture displayed on the base screen is also turned from the OFF state (JI) to the ON state (J2).

This arrangement enables display on the display screen 112 by the PLC 70 that corresponds to a control state of the target system 8, data input by fingers through the touch panel, as well as indirect control of the target system 8 by the PLC 70.

Here, not only state data MD of the PLC 70 directly connected with the programmable display device but also state data of the PLC 2c indirectly connected thereto via the common communication line 6 can be designated as the state data MD that are referred to by the foregoing processing instruction word W. For instance, information indicative of the PLC 70 or information indicative of the programmable display device connected with the PLC 70 is added in the address A of the reference information r, based on which each control-target device 9 in the control system is may be distinguished. This allows all the PLCs to be controlled in association with each other, via the programmable display device.

Figure 9:
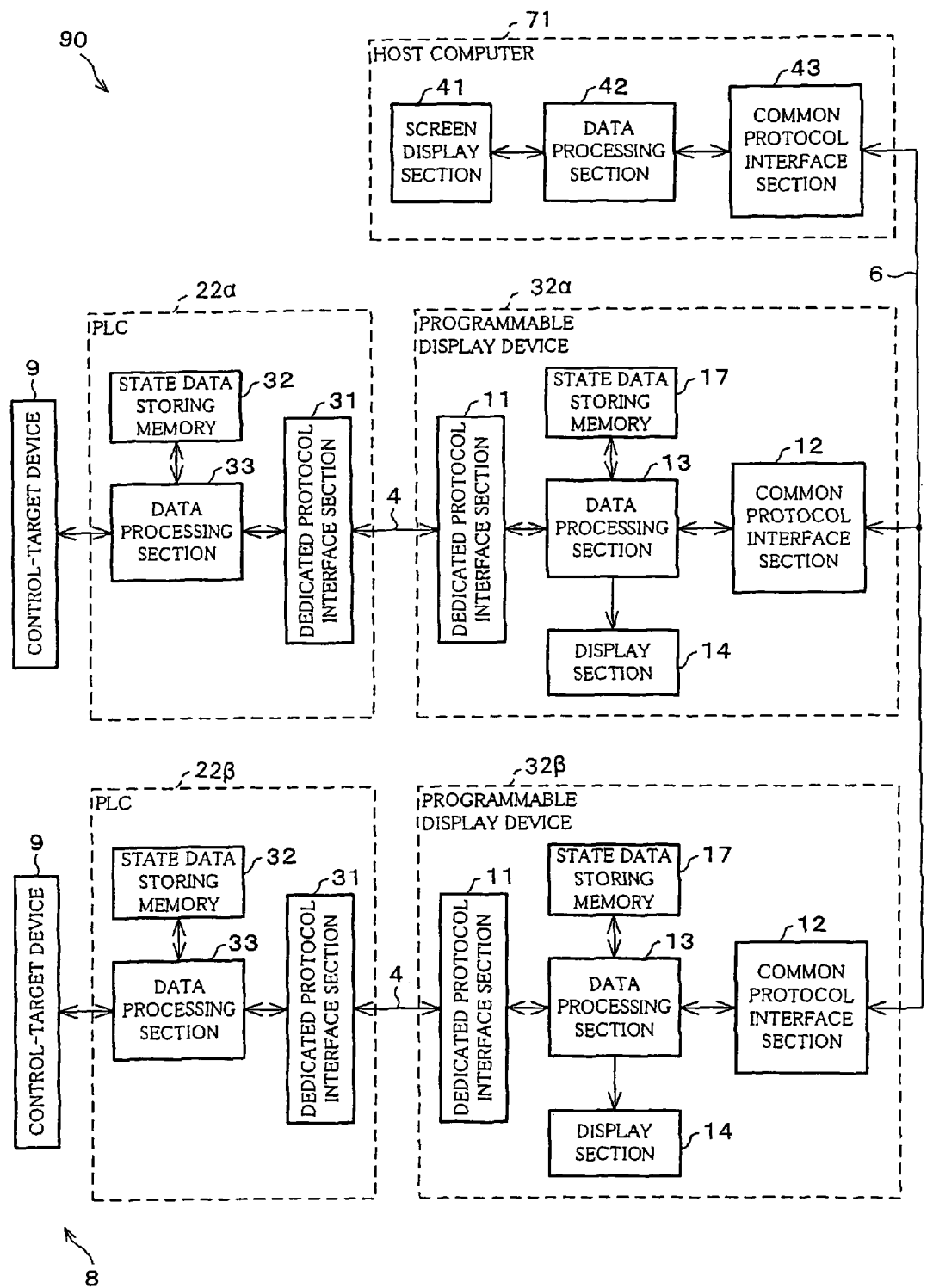
FIG. 9 is a block diagram illustrating a principal part of the foregoing control system.

A control system 90 is shown in FIG. 9. Here, as function blocks in the PLC, a dedicated protocol interface section 31, a state data storing memory 32, and a data processing section 33 are provided. The dedicated protocol interface section 31 is realized by the foregoing computer-linked unit 105 and the like, for communication using the dedicated protocol specific to the PLC. The state data storing memory 32 is realized as a region of the foregoing RAM 117, for storing state data MD including contents of a bit device or a word device set on the PLC side. The data processing section 33 is realized by the CPU 115 executing a program stored in the ROM 116 or the like, for processing data inputted/outputted to/from the target system 8, the dedicated protocol interface, etc. Likewise, the host computer 71 includes, a screen display section 41 for executing screen display, a data processing section 42 for controlling the entirety of the host computer 7c, and a common protocol interface section 43 for communication with the common protocol.

The foregoing data processing section 42 of the host computer 7c carries out a predetermined data processing operation, and displays a result of the operation on the display screen of the screen display section 41. The data processing section 42 sends data to be transmitted to the common communication line 6 via the common protocol interface section 43. By so doing the data are transmitted on the common communication line 6 according to the common protocol.

On the other hand, the data processing section 33 of each PLC inputs/outputs signals with respect to the control-target device 9 of the target system 8 in accordance with the program set beforehand, as well as stores data of contents corresponding to a control state at that time (state data MD) in the state data storing memory 32 set in the memory unit 104. Incidentally, an address in the state data storing memory 32 at which the data are stored is determined, for example, according to the control-target device 9 and the like. The state data MD changed are sent according to the dedicated protocol to the programmable display device via the dedicated protocol interface section 31 of the PLC and the dedicated communication line 4, so as to be stored in the state data storing memory 17. Conversely, when data to change the state data MD in the PLC are fed via the dedicated communication line 4 from the programmable display device, a control operation corresponding to the changes in the data is carried out with respect to the control-target device 9.

According to an aspect of the present invention, it is arranged beforehand that various kinds of data generated in the programmable display device or taken into the programmable display device from the PLC are, automatically at uniform intervals, or appropriately in response to a command, fed to the host computer 71, via the common communication line G. This enables a lessening of memory capacity provided in each programmable display device, and managing of all data together by building up a database of data sent from all the programmable display devices.

Furthermore, in each programmable display device, necessary data can be retrieved from the host computer at an appropriate timing and displayed on the display screen D of each programmable display device, or utilized in the control operation of the PLC. Furthermore, it is also information regarding all the control devices 5 can be obtained by the host computer 7c via any one of the display devices.

Furthermore, according to an aspect of the present invention, to manage all data for communication according to the dedicated protocols (protocol information) together, a protocol database is built up in the host computer with the protocol information suitable to the PLC that could be connected with the programmable display devices.

In the foregoing control systems, at an initial setting of the programmable display device, the programmable display device selects protocol information corresponding to the PLC connected therewith from the protocol database stored in the host computer, and downloads the same via the common communication line according to the common protocol. This enables mutual data transmission between the programmable display device and the PLC according to the dedicated protocol of the PLC.

Furthermore, the programmable display device is set so that contents of data that the programmable display device processes are specified by using the foregoing processing instruction word W and the processing instruction word W is stored in the event data storing memory 122, while the state data MD of the PLC referred to according to each processing instruction word W are maintained in the state data storing memory 17.

Upon an end of the initial setting, a normal control operation is carried out. For instance, in the case where control of a second PLC 22β is conducted using state data of a first PLC 22α, a processing instruction word is set beforehand as the processing instruction word set for the second display device 32β and the state data of the first PLC 22α is referred to and the second PLC 22β executes a control operation based on the foregoing state data.

In this state, when state data MD is sent to the first programmable display device from the first PLC 22α using the dedicated protocol thereof, the corresponding state data MD is updated in the state data storing memory 17 of the first programmable display device 3cα. The state data MD thus updated are sent to the state data storing memory in the second programmable display device 32β using the common protocol in response to a reading operation on the second programmable display device 32β side.

Here, in the case where the processing instruction word W is set beforehand so that the updated state data MD are utilized in a control operation of the second PLC 22β, the state data MD is further transferred to the second PLC 22β, using the dedicated protocol. Thus, the control operations of the second PLC 22β is carried out based on the data of the first PLC 22α.

Conversely, in the case where state data MD taken in by the second programmable display device 32β is data to be processed by the foregoing programmable display device 32β, the data is processed by the second programmable display device without being transferred to the second PLC 22β. Then, display corresponding to the state data MD is executed on the display screen of the display.

Furthermore, in the case where data are sent from the host computer to the first PLC 22α so as to control the control-target device connected with the foregoing PLC 22α, data is produced by adding an address specifying the first PLC 22α to the data to be transmitted, and is fed to the first programmable display device 32α via the common communication line according to the common protocol.

On the other hand, programmable display device 32α, where data is fed from another programmable display device, judges whether the data fed thereto is data to be used by that programmable display device 32α or the data is to be used by the first PLC 22α. In the case where they are judged to be the data for the PLC 22α, they are transmitted to the PLC 22α according to the dedicated protocol.

Thus, even in the case where the data communication protocols are dedicated for the PLCs, respectively, and hence different from each other, state data MD corresponding to a control state in the PLCs can be transferred via the programmable display device between a plurality of the PLCs or between the PLC and the host computer.

According to an aspect of the present invention, the programmable display device has the state data (MD) in itself at all times, that is, the case where the state data storing memories 17 and 32 are provided in the programmable display device and the PLC, respectively, and the programmable display device accesses the PLC side regularly at predetermined short intervals so that the data contents of the state data storing memories 17 and 32 should coincide with each other. As explained in the descriptions of the embodiments below, however, the state data may be taken from the PLC side as required, upon occurrence of a specific event or the like, for example. In the case where the state data storing memories 17 and 32 are provided on both sides, respectively, however, what has to be done is only designation of the programmable display device connected with the PLC and an address in the state data storing memory 17 in the programmable display device 3c, and there is no need to specify a PLC in a format of a counterpart code, etc.

[Fifth Aspect]

The following description will explain in more detail a protocol converting operation display device, while referring to FIGS. 10 through 13. Members having a similar structure (function) as those in the above-mentioned aspects of the invention are designated by the same reference numerals and their description will be omitted.

A display device 103 includes a protocol converting section 133 and a protocol information storing section 18, in addition to the protocol interface sections 11 and 12 and the display section 14. The protocol converting section 133 executes protocol conversion between a dedicated protocol and a common protocol. The protocol information storing section 18 stores protocol information that is referred to upon protocol conversion.

Protocol information is divided into (i) a conversion table that shows correspondence between information specific to the PLCs such as command data and information of the common protocol corresponding to the specific information, and (ii) a format of transfer information transferred to/from the PLC (format information), and are stored in a conversion table storing section 181 and a format information storing section 182, respectively. Incidentally, the storing sections 18 e.g., 181, 182 can be regions on the RAM 117 shown in FIG. 5, for instance.

More specifically, in a dedicated or common protocol used in a control system 101 in accordance with an aspect of the present invention, a format in which information to be transferred is provided between a start code and an end code as shown in FIG. 11, like a general asynchronous system data transfer format, is specified as a asynchronous system data transfer format C. Data transfer formats specified by PLC manufacturers, however, differ in not only start codes and end codes, but also contents of data contained in the transferred information and the order of data provided therein.

Here, a format Cr for data reading and a format Cw for data writing are specified as data transfer formats to be transferred via the common communication line 6. More specifically, in addition to a counterpart code for specifying a device to which data are transmitted (for instance, "A·B . . . ") and a common code (for instance, "01") for uniformly specifying a command to be executed (reading command), the data-reading-use format Cr further includes an address (for instance, "X0001") at which the reading should be started, and a size of data to be read, as relevant information attached to the common code. Furthermore, in addition to the counterpart code and the common code that instructs the data writing, the format Cw specified for data writing further includes an address at which the writing should be started, and data to be written as relevant information. Each of the formats Cr and Cw is expressed as data obtained by providing the included data in series with use of ASCII codes of hexadecimal notation.

Between commands having the same contents among commands comprehensible to each PLC, the foregoing common codes are made uniform, irrespective of command codes at the dedicated communication lines 4 (command at each PLC). Besides, for instance, an order of data of relevant information such as a reading start address and a reading data size in which the data are transmitted, and expression of data when the data are transmitted, are also made uniform irrespective of the dedicated protocols. This allows the common protocol to uniformly specify a command to be executed, irrespective of PLCs.

Figure 13:
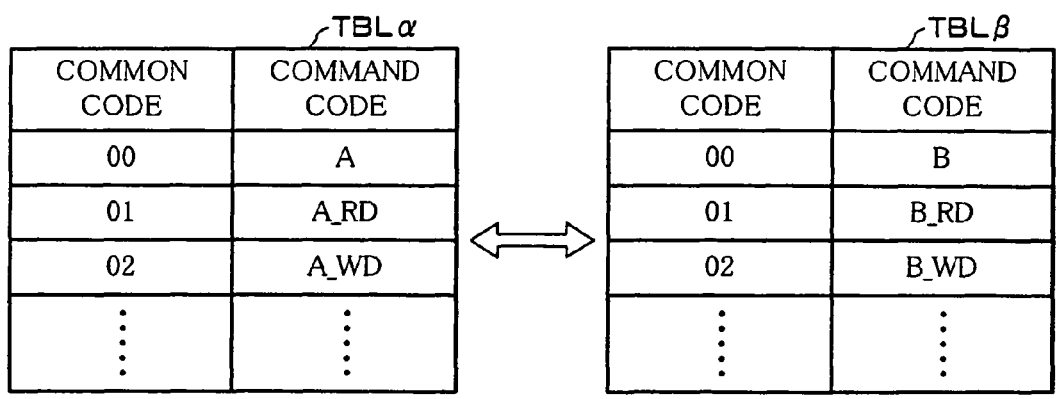
FIG. 13 is an explanatory view illustrating an example of a conversion table used in protocol conversion between a dedicated protocol and a common protocol in the foregoing control system.

Here, since correspondence between a certain common code and a command code (specific code) at the dedicated communication line 4 in one PLC differs from that of another PLC, a conversion table in which each common code and a specific code of the PLC currently connected corresponding to the foregoing common code are paired is formed, as shown in FIG. 13. Therefore, the display device 103 can convert a common code to a specific code or vice versa, referring to the conversion table corresponding to the dedicated protocol. Furthermore, for instance, the dedicated protocol for protocol conversion can be changed by changing a conversion table used for protocol conversion from a conversion table TBLα for a dedicated protocol α to a conversion table TBLβ for a dedicated protocol β.

Figure 12:
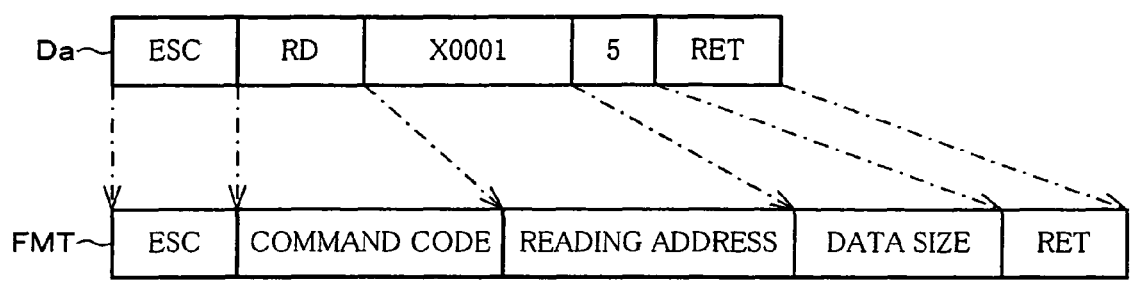
FIG. 12 is an explanatory view illustrating an example of data transfer format used in a dedicated protocol in the foregoing control system.

On the other hand, as shown in FIG. 12, the foregoing format information FMT is, among data streams Da transmitted via the dedicated communication line 4, a data stream on a skeleton in which portions that may change depending on contents of data to be actually transmitted, such as the contents of data to be read/written per se, a size of the data, or addresses for reading/writing are undefined, and only purposes of use are defined regarding the undefined portions. Incidentally, if the regions for command are undefined, in the case where format information FMT extracted from data streams actually transmitted is common among a plurality of commands, the regions for the foregoing command may be undefined also, so that format information FMT common among these commands can be used.

The foregoing format information and conversion tables are stored in a protocol data base of the host computer as the aforementioned protocol information corresponding to each dedicated protocol, while protocol information corresponding to the PLC connected to the display device is read upon initial setting of the display device and is stored via the common communication line 6 in the foregoing conversion table storing section 181 and the format information storing section 182.

In the foregoing arrangement, pieces of protocol information corresponding to respective dedicated protocols are individually provided as format information FMT and conversion tables. Therefore, by switching the protocol information depending on a type of an apparatus, data communication according to a particular dedicated protocol is enabled.

Here, the control system 101 in accordance with the has a data transfer format specified as common communication protocol as described above used as often as possible at the reading/writing of data from/to the display device to the PLC, as well as at other occasions (for instance, upon display at the display device, and upon setting of preset data). Consequently, operations except control, such as a displaying operation and an operation of setting preset data, need not be changed for each dedicated protocol. Therefore, steps in the processes of development, management, and maintenance of software can be decreased.

Figure 14:
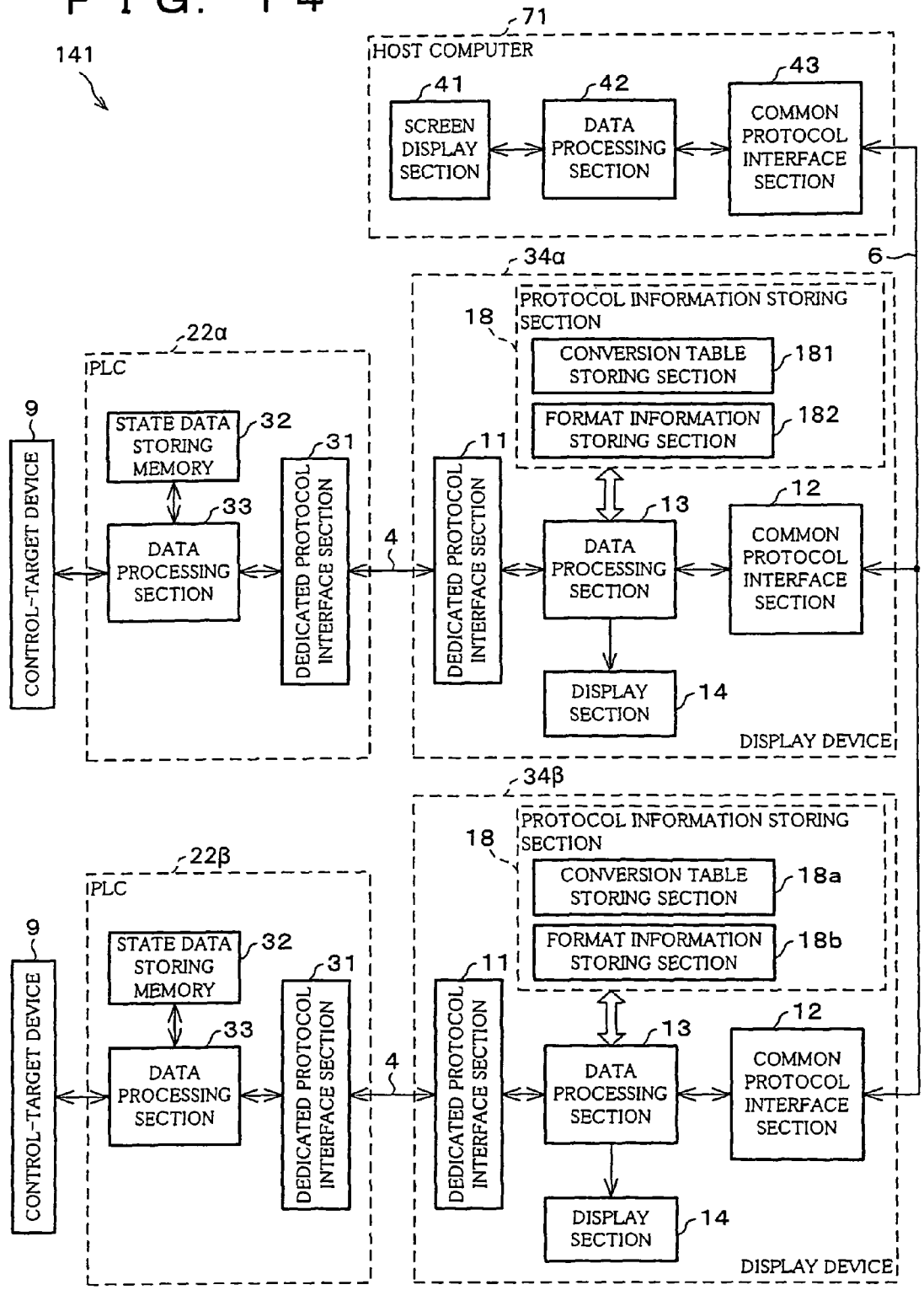
FIG. 14 is a block diagram explaining the foregoing control system in more detail.

The following description will explain protocol conversion using the foregoing format information FMT and conversion table while referring to FIG. 14. Incidentally, the control system 141 shown in FIG. 14, unlike the control system 90 shown in FIG. 9, adopts a method in which the state data storing memory is provided only in the PLC and the display device reads the state data MD from the state data storing memory 32 in the PLC upon necessity, as another method for state data transfer between the PLC and the display device.

For instance, in the case where the second PLC 22β executes a control operation by utilizing a change in the state data MD in the first PLC 22α, the second display device 34α is set to refer to the state data MD of the first PLC 22α in response to a processing instruction word set in the second display device 34α, and the second PLC 22β is set so as to execute a control operation based on the state data MD.

In this state, via the common communication line 6, a data reading command is launched in the data-reading-use data transfer format Cr shown in FIG. 11 to the first PLC 22α, the protocol converting section 133 of the first display device 34α refers to the conversion table storing section 181, to convert the common code in the transferred information to a specific code. Further, the protocol converting section 133 refers to the format information storing section 182, to apply necessary data such as a specific code, an address, a size, etc. to undefined portions of the format information FMT, thereby converting the same into a dedicated format. Thereafter, the data are transferred to the first PLC 22α via the dedicated communication line 4. Incidentally, as to an address and a size of data transmitted according to the dedicated protocol, expression formats (for instance, a bit width), if different from that of the common protocol, are converted by a predetermined procedure.

The first PLC 22α receiving the data analyzes contents of the data, and retrieves necessary data from the state data storing memory 32. Thereafter, necessary data are sent from the first PLC 22α to the first display device 34α according to the dedicated communication protocol.

On the other hand, the first display device 34α analyzes contents of the received data, referring to the conversion table storing section 181 and the format information storing section 182. In the case where the data are judged to be the data last time requested for reading and further in the case where a processing instruction word W is beforehand set in the data so as to be used in a control operation of the second PLC 22β, the first display device 34α designates the second PLC 22β as the counterpart code, and sends the same to the second display device 34β by using the common protocol. Thus, an operation of controlling the second PLC 22β based on the first PLC 22α is executed.

Incidentally, the data sent to the second display device 34β is processed only by the display device 34β, the data is processed in the second display device 34β without being transferred to the second PLC 22β, and display corresponding to the display screen D of the display section 14 is executed.

Furthermore, in the case where data is transferred from the host computer 71 to the first PLC 22α so that the control-target device 9 connected to the first PLC 2α should be controlled, the counterpart code and address for specifying the first PLC 22α are attached to the data to be transmitted. The resultant data is transmitted to the first display device 34α via the common communication line 6 according to the common communication protocol.

The first display device 34α determines whether the data transmitted thereto is to be used in the display device 34α or to be used by the first PLC 22α, referring to the counterpart code. In the case where the data is to be used by the first PLC 22α, the data is transmitted to the first PLC 22α side in a manner identical to that described above, by using the dedicated communication protocol.

Incidentally, in the above description of the present embodiment, a case where a plurality of devices to be subjected to data access are present and a counterpart code is specified is taken as an example. However, in the case where the counterpart of data communication is specified beforehand, the counterpart code is unnecessary.

[Sixth Aspect]

Prior to protocol conversion of the foregoing display device, the dedicated protocol subjected to conversion has to be selected according to a control unit (PLC). This selection of the dedicated protocol may be carried out beforehand by the user of the display device. However, to save labor and time for setting and to prevent errors in setting, a dedicated protocol is preferably selected automatically by the display device. The following description will explain a display device 131 capable of automatically selecting a dedicated protocol, while referring to FIGS. 15 through 17. In the following description, for conveniences' sake, a case where dedicated protocols of PLCs that can possibly be connected with the display device are four kinds, "α, α2, β, and γ" is taken as an example, but the numbers can be appropriately increased or decreased, needless to say.

Figure 10:
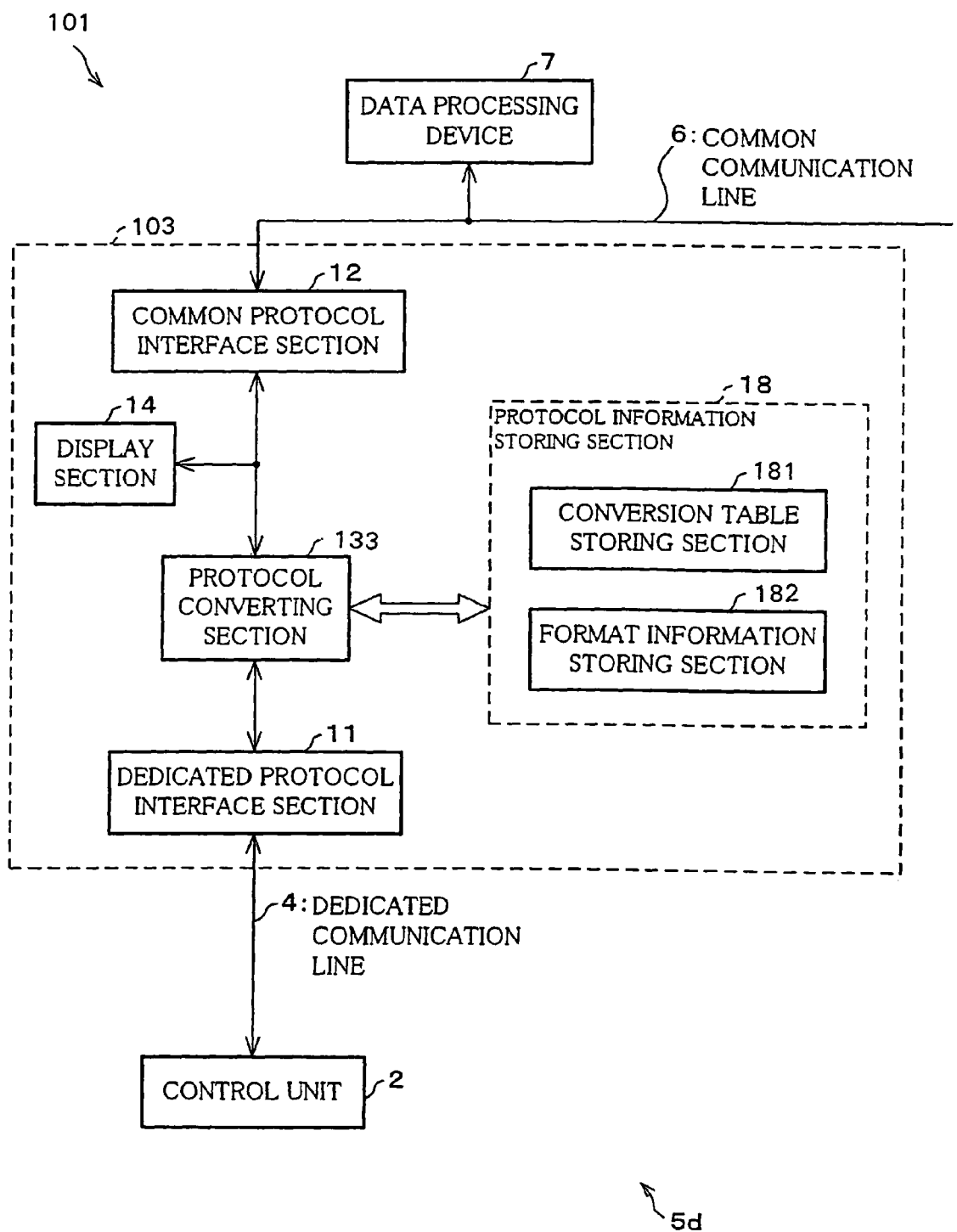
FIG. 10 is a block diagram illustrating a principal part of a control system in accordance with still another embodiment of the present invention.
Figure 15:
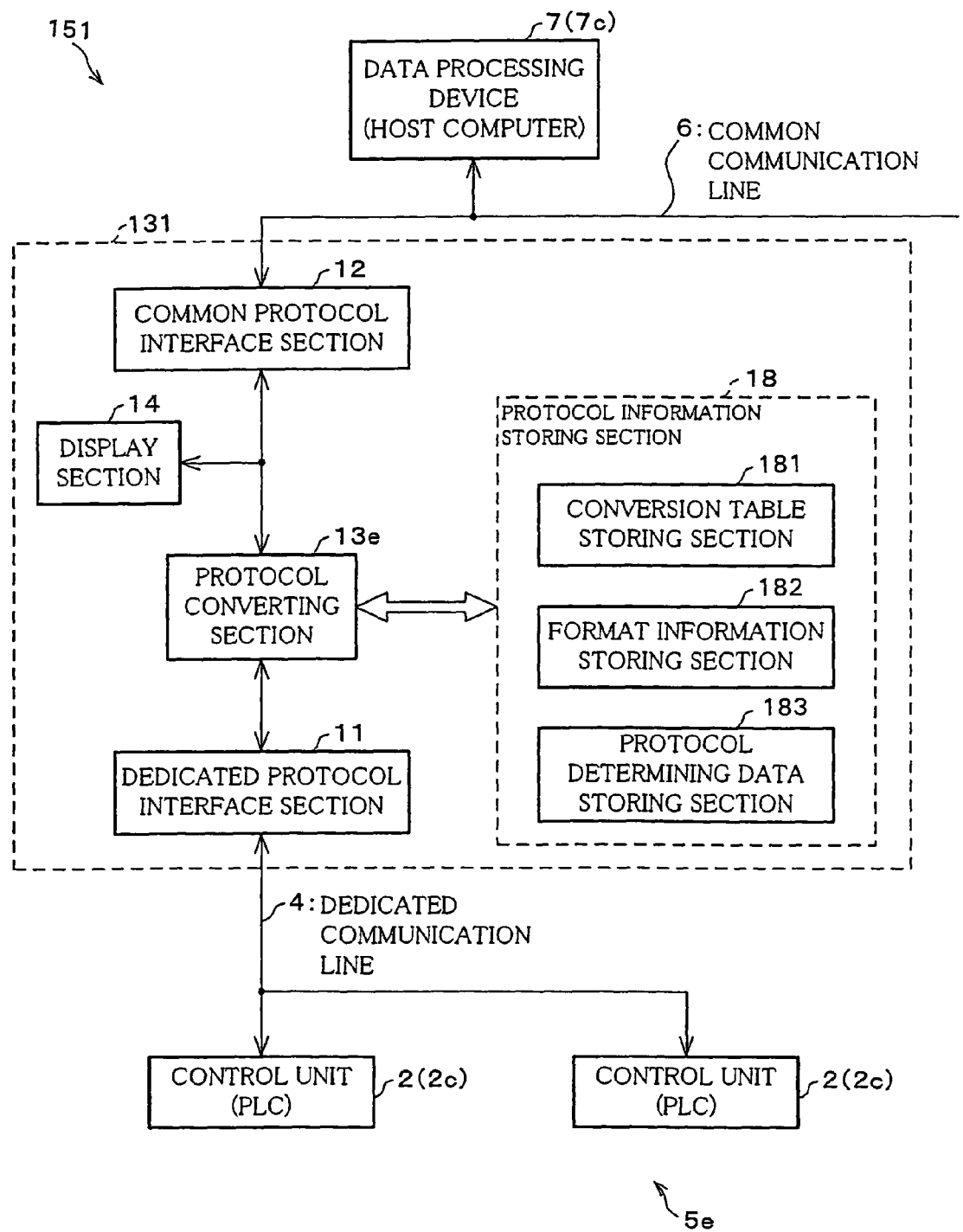
FIG. 15 is a block diagram illustrating a principal part of a control system in accordance with still another embodiment of the present invention.

More specifically, as shown in FIG. 15, a display device 151 in accordance with the an aspect of the present invention is provided with a protocol determining data storing section 183 for storing a correspondence table for dedicated protocol determination use, in addition to the arrangement of the display device 103 shown in FIG. 10.

The correspondence table is a table in which response codes upon issuance of predetermined protocol-determination-use commands (for instance, "00") are listed up with respect to dedicated protocols, as shown in FIG. 16A. Selected as the protocol-determination-use commands are commands such that response data as different as possible from each other can be obtained so as to correspond to differences between the communication protocols. Here, as shown in the correspondence table of FIG. 16A, the same response codes are returned like the cases of the dedicated protocols α and α2. In this case, another determination-use command (for instance, "01") is set, and a table of correspondences between the dedicated protocols and response data is prepared as shown in FIG. 16B, so that determination of a dedicated protocol should be ensured according to a combination of a response code with each protocol-determination-use command.

Figure 17:
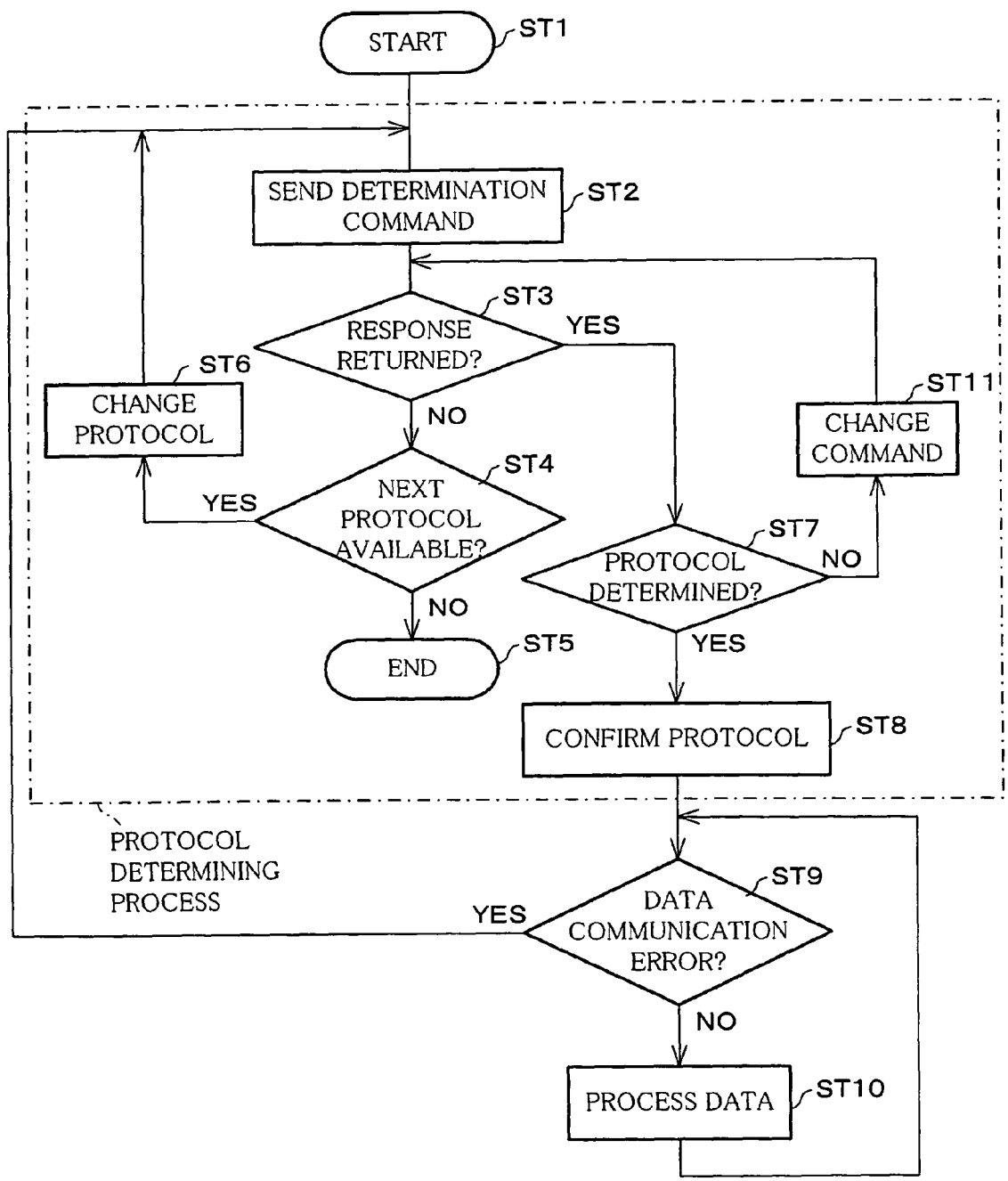
FIG. 17 is a flowchart illustrating an automatic judging procedure of the dedicated protocol in the foregoing control system.

In the foregoing arrangement, actuation of the system at an operation 1 (ST1) in the flowchart shown in FIG. 17 is followed by a communication protocol determination process that starts at operation 2. In this process, at operation 2, a protocol determination command like "00" is fed from the display device 131 to the PLC 2c.

At operation 3, in the case where there is no response from the PLC, it is determined that data communication per se with the PLC is not established. Then, in the case where it is determined that all the protocols have been checked at operation 4, it is determined that the PLC is not connected or that its protocol is a protocol other than the prepared ones, and the operation proceeds to operation 5, where the determining operation ends. On the other hand, in the case where it is determined at the operation 4 that there remains a protocol to be checked next, a protocol applied at a operation 6 is changed, and the flow returns to the operation 2 so that the aforementioned processing operation should be repeated. Incidentally, each protocol is selected in correspondence to the PLC that can possibly be connected with the display device, and it is prepared beforehand in a form like protocol information stored in the protocol information storing section 18. The protocol information is, for instance, downloaded at the initial setting stage, from a protocol data base stored in the data processing device 7, or the like.

Furthermore, confirmation of a response from the PLC at the operation 3 is followed by the proceeding to a step 7 where a correspondence table regarding to a protocol determination command sent, among the correspondence tables stored in the protocol information storing section 18, is referred to, and a protocol corresponding to the response code is determined. For instance, in the correspondence table shown in FIG. 16A, the communication protocol is determined to be "β" in the case where the response code is "20", while the protocol is determined to be "γ" in the case where the response code is "30". Therefore, after the communication protocol to be used is confirmed at the operation 8, a normal data processing operation at operation 10 is maintained.

In the case where the response code confirmed at the operation 7 is "10", the communication protocol can possibly be or "α" or "α2", and hence cannot be determined. Therefore, this is followed by return to the operation 1, where the determination command is changed to "01" and an identical determining operation is carried out. In this case, as shown in FIG. 16B, the protocol is determined to be "α" in the case where the response code is "01", while the protocol is determined to be "α2" in the case where the response code is "02". In the case where the response code is anything other than those, the communication protocol is determined to be something other than those prepared.

Furthermore, in the case where a communication error occurs at operation 9 during a normal data processing operation, it is presumed that a changing operation such that the PLC connected to the display device 131 is changed to another took place. In such a case, the flow returns to the communication protocol determining process that starts with operation 2, in which a communication protocol suitable to the PLC is automatically set. This enables to complete the communication protocol setting operation, without an initial setting operation in a state in which the display device is suspended.

[Seventh Aspect]

Figure 18:
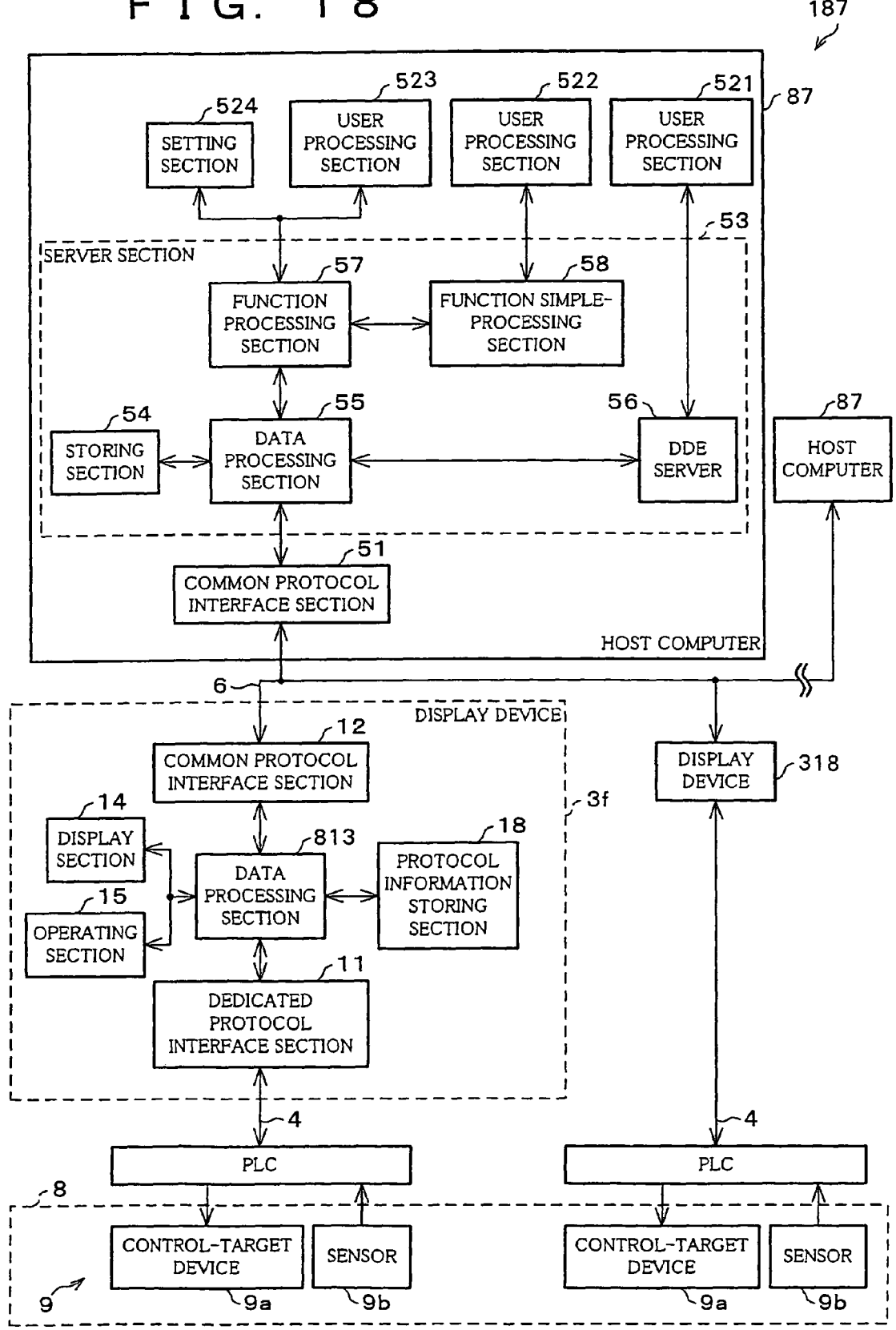
FIG. 18 is a block diagram illustrating a principal part of a control system in accordance with still another embodiment of the present invention.

The following description of an aspect of the present invention will explain an arrangement of a host computer of a control system 187 in more detail, while referring to FIG. 18. A host computer 87 for control use includes a common protocol interface section 51 for communication with the common network 6, various processing sections 52, and a server section 53. The processing sections 52 include user processing sections 521 through 523 for display or control of the state of the target system 8 of the host computer 87, and a setting section 524 for executing the setting of the whole control system 187. The server section 53 is provided between the processing section 52 and the common protocol interface section 51, so as to control the common protocol interface section in response to a request from the processing sections or the like. Furthermore, in the server section 53, in addition to a data processing section 55 that controls the common protocol interface section 51 so as to cyclically store data from each PLC to a storing section 54, there are provided a DDE server section 56, a function processing section 57, and a function simple-processing section 58, so that the data processing section 55 and the various processing section 52 communicate each other through a plurality of procedures.

The foregoing DDE server section 56 functions as a server for dynamic data exchange (DDE) defined by an operating system. Therefore, in the case where the processing section 52 is a user processing section 521 capable of operating as a DDE client, the user processing section 521 and the DDE server section 56 can transmit data mutually without troubles.

Thus, since the server section 53 in accordance with an aspect of the invention is provided with the DDE server 56, the processing sections 52 previously described are applicable for the foregoing purpose as long as the processing sections 52 are capable of functioning as clients in DDE. Incidentally, in the case where the control system 187 has been used since before, the processing sections 52 are specialized for each control system 187, and it is often bothersome to produce new processing sections 52. Besides, the processing sections 52 are often arranged so as to transmit data through a procedure defined by the operating system of the host computer 87, such as DDE, so as to be associated with another application that operates on the operating system of the host computer 87. Therefore, in many cases, the processing sections 52 can be applied without troubles.

Furthermore, since the foregoing DDE is defined by the operating system, relatively many applications that are available in the market can operate as DDE clients. Therefore, even in the case where the processing sections 52 are not used, a user processing section 521 can be relatively easily prepared by using these applications.

Furthermore, as described above, each display device 318, including data processing section and the host computer 87 communicate mutually according to the common protocol, irrespective of a type of the PLC connected with the display device 318. Therefore, when the PLC connected with the display device is changed or when a newly developed PLC is connected thereto, the foregoing DDE server section 56 need not change its operation. Consequently, time and labor for developing programs of the host computer 87 can be drastically saved as compared with the case where different DDE server sections 56 are prepared for each PLC as conventionally, and therefore, time and labor can be saved upon incorporation of a new PLC to the control system 187.

Incidentally, the foregoing DDE is a procedure defined by the operating system for dynamic data exchange between various applications, and is not necessarily optimized for control of the control-target devices 9. In result, in the case where the data exchange with the processing sections 52 is limited to DDE, the processing rate can possibly decrease, and some processing operations cannot be executed. Consequently, the server section 53 in accordance with the present embodiment is provided with the function processing section 57 and the function simple-processing section 58, for exchange of data with the processing sections 52 by a procedure other than DDE.

The foregoing function processing sections 57 and 58 are interfaces between the foregoing data processing section 55 and the processing sections 52 that require a processing operation that cannot be executed or whose processing rate is insufficient in the case of data exchange by DDE, such as the user processing section 522 or 523 that executes higher-level processing operations as compared with the user processing section 521, or the setting section 524 that executes the setting of the whole control system 187. For instance, the function processing sections 57 and 58 can be realized as DLL (dynamic link library) in Windows as the operating system of Microsoft Co. Among the function processing sections 57 and 58, the function processing section 57 includes as recallable functions all the functions that the data processing section 55 can possibly be requested to do by the processing sections 52, such as all the settings conducted by the setting section 524, display and control of data from the control-target devices 9, the PLCs, and the display devices 318, etc. Incidentally, the foregoing settings include the setting upon incorporation of a display device 318 into the common network 6, the setting of each PLC connected with each display device 318, and the setting of relationship between the control-target devices 9 and device addresses. Thus, the processing sections 52 can control all the functions of the data processing section 55 by recalling each function of the function processing section 57.

For instance, in the case of a function for reading data from a control-target device 9, an IP address of a display device 318, a name of the control-target device 9, etc. are given as arguments, while success/failure of the reading, data read out, etc. are returned as returned values, like in the DDE case. The function is optimized for data reading from the control-target device 9, unlike the DDE case. Therefore, an amount of data transmitted from the processing sections 52 to the data processing section 55 or processed therein upon reading of data can be decreased. Furthermore, the link setting is unnecessary. Therefore, in the case of an identical processing operation, the processing rate can be improved, as compared with the DDE case. Furthermore, in the case where an optimal procedure is different even with respect to a similar processing operation, functions are prepared for respective processing operations so that the processing operations can be carried out through the optimal procedures, respectively. Therefore, by selecting and using an optimal function for each processing operation, the processing rate can be improved as compared with the later-described case where the function simple-processing section 78 is utilized. Furthermore, processing operations such as settings of various kinds and transmission of data at specified timings, which cannot be defined by DDE, can be realized.

On the other hand, in the function simple-processing section 58, there are provided, among the functions prepared by the function processing section 57, only functions that can be used relatively easily and that cannot be executed at a sufficient speed by DDE. Functions satisfying the foregoing requirements include a function for reading data from a PLC via a display device 318, and a function for writing data from a PLC via a display device 318. These functions do not provide return values before the writing and reading operations are completed, whereby control is not returned to the processing sections 52. Incidentally, in the present embodiment, the functions are realized by recall of functions in the function processing section 57 by the function simple-processing section 58, but the function simple-processing section 58 may control the data processing section 55 directly.

Thus, as to the function simple-processing section 58, the number of functions prepared, the number of arguments, and the timings for return of control to the processing sections 52 as recalled are further limited, as compared with the case of the function processing section 57. Therefore, use of only the functions of the function simple-processing section 58 in producing the user processing section 522 enables to save time and labor for selecting optimal functions from among similar functions, time and labor for conducting the setting of arguments and the initial setting in order to use optimal functions, and time and labor for considering timings of control. Consequently, though the processing rate is higher than in the DDE case, the user processing section 522 can be created relatively easily.

Here, since the host computer 187 communicates according to the common protocol, the foregoing function processing section 57 or the function simple-processing section 58 need not change its operation, even in the case where the PLC connected to the display device is changed or in the case where a newly developed PLC is connected thereto. Consequently, time and labor for developing a program of the host computer 87 can be drastically saved, as compared with the case where different function processing sections 57 and different function simple-processing sections 58 are prepared for each PLC. Therefore, time and labor required upon incorporation of a new PLC in the control system 187 can be saved.

Additionally, the server section 53 in accordance with the present aspect is equipped with the two function processing sections 57 and 58 whose degrees of difficulty in recalling differ from each other. Therefore, the developer of the server section 53 is allowed to recommend use of the function processing section 57 or use of the function simple-processing section 58 depending on respective expertise of the developers of the processing sections 52 and respective necessary functions of the processing sections 52. Consequently, errors of the control system 187 caused by a mistake of the developers of the processing sections 52 can be prevented more surely, as compared with the case where only the function processing section 57 is provided, in spite of that more complex or higher-speed processing is possible as compared with the case where only the function simple-processing section 58 is provided. Incidentally, the present embodiment is explained by taking as an example the case where there are two different degrees of difficulty of the function processing sections, but a plurality of function processing sections with different degrees of difficulty may be provided so that the same effect can be achieved.

Furthermore, in the foregoing embodiment, there is provided the DDE server section 56 that is capable of recalling data through a simpler procedure than those of the function processing sections 57 and 58, and data can be exchanged to some extent without development of the processing sections 52. Therefore, errors upon development of the processing sections 52 can be further reduced, whereby errors in operations of the control system 187 can be prevented.

[Eighth Aspect]

Incidentally, the foregoing first through seventh aspects of the present invention are described by taking as an example the case where data transmitted through the common communication line 6 are mainly data for control of the control unit 2, but identical effects such as reduction of time and labor in development, management, and maintenance of the control system 1 can be achieved in the case where other data such as image data like background images, initial values, or application programs are transmitted.

Figure 19:
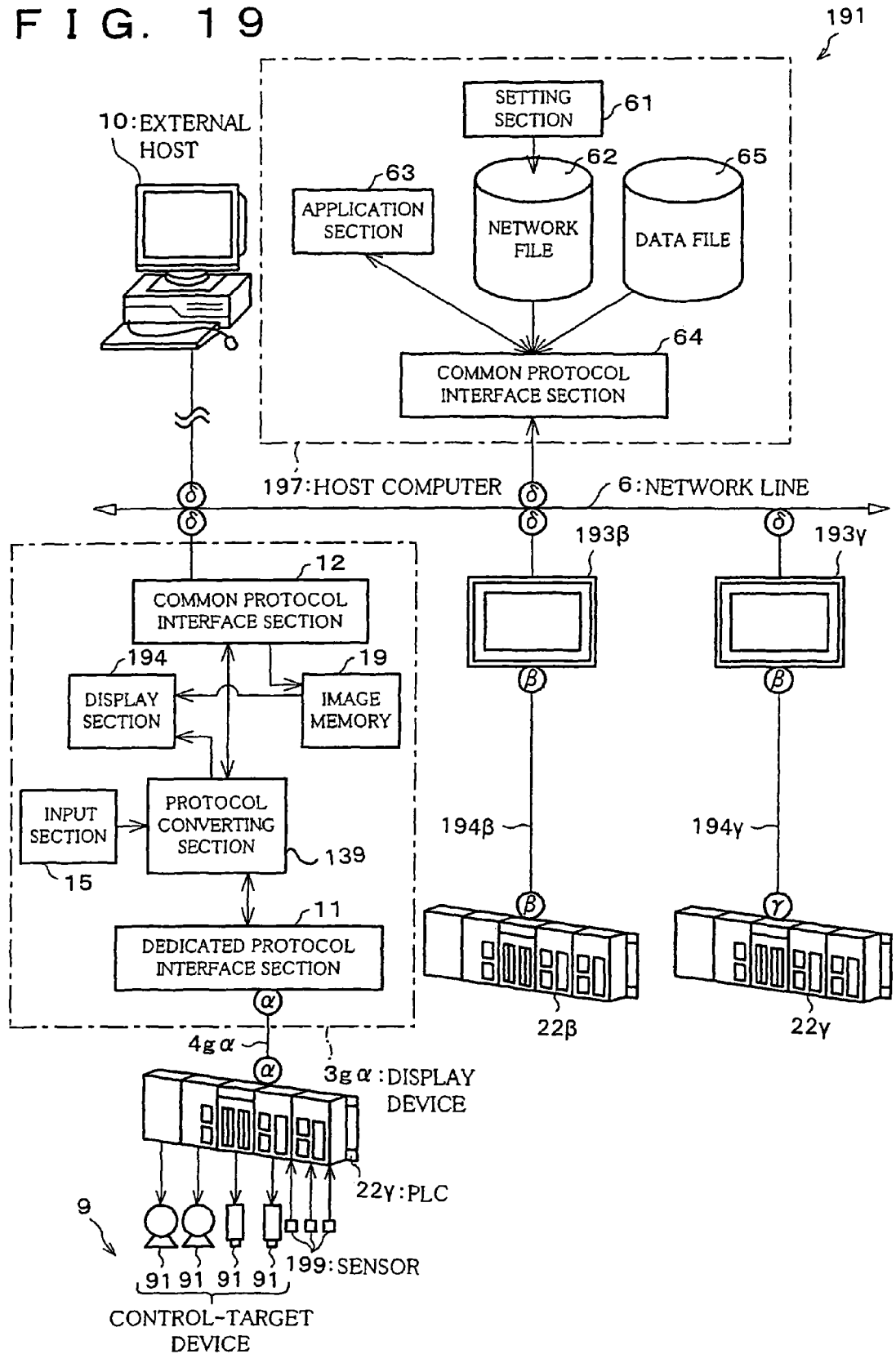
FIG. 19 is a block diagram illustrating a principal part of a control system in accordance with still another embodiment of the present invention.
Figure 20:
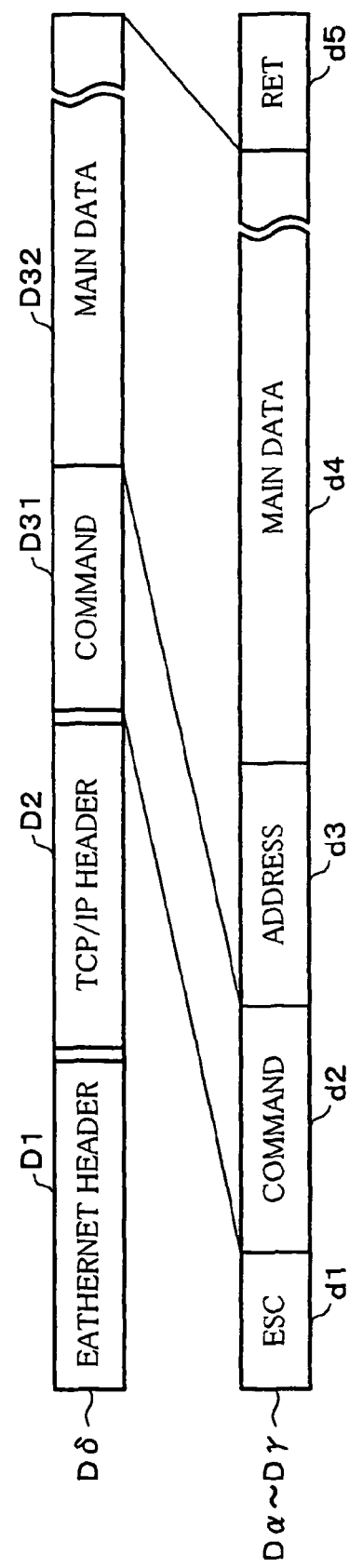
FIG. 20 is an explanatory view illustrating an example of a data transfer format used in the foregoing control system.
Figure 21:
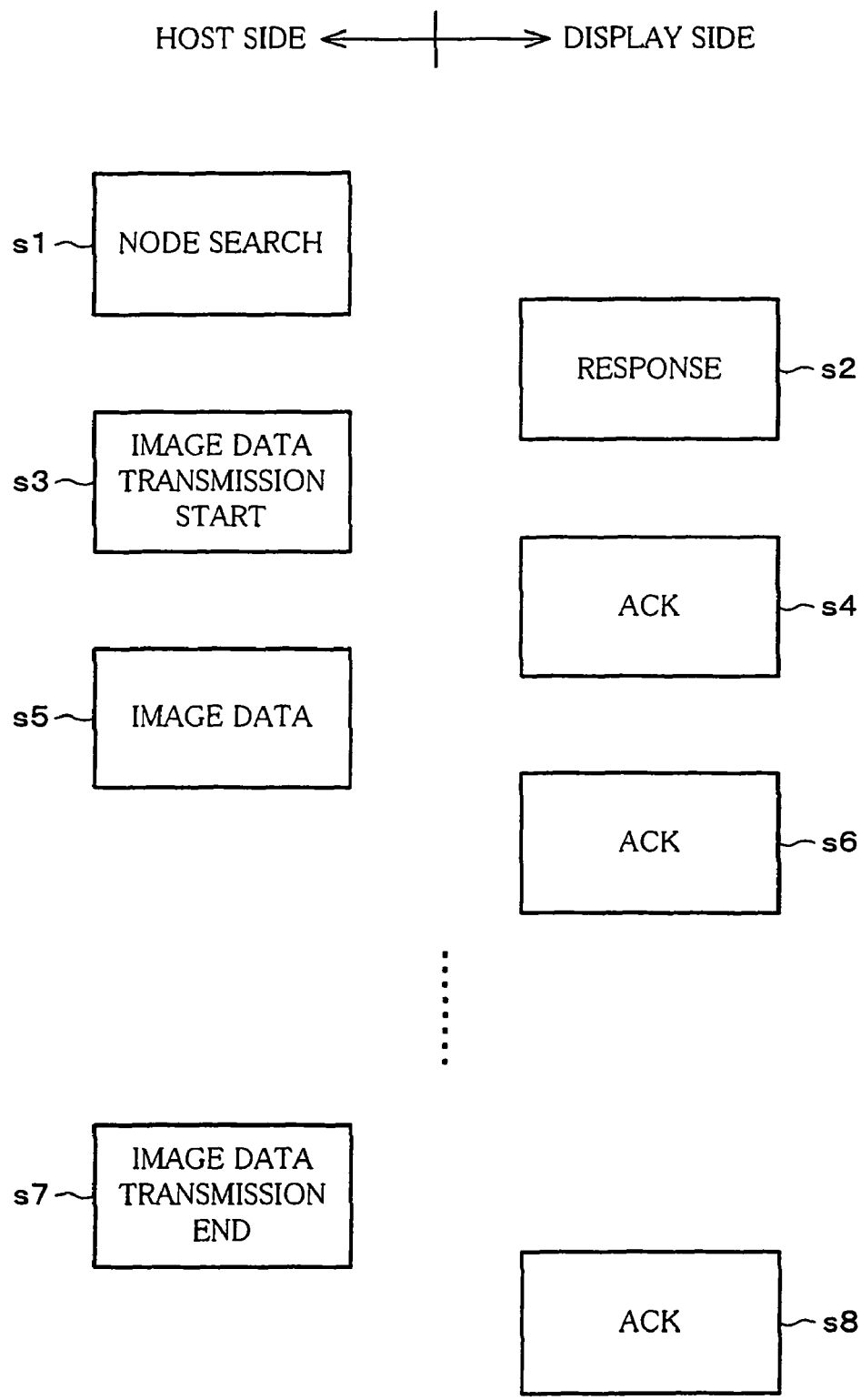
FIG. 21 is a timing chart for explaining a download operation of image data from a host side to a display device side in the foregoing control system.

The following description will explain, as an embodiment of the present invention, the case where characters and image data to be used in information display concerning PLC control are transmitted, while referring to FIGS. 19 through 21.

FIG. 19 is a block diagram schematically illustrating a control system 191 in accordance with an aspect of the present invention. PLCs 2cα, 2cβ, and 2cγ control control-target devices 91 such as a motor and an electro-magnetic valve, among control-target devices 9, in response to a control output of a host computer 197. Further, the PLCs 2cα, 2cβ, and 2cγ detect controlled states of the foregoing control-target devices 91, by means of sensors 199 among the control-target devices 9, and transmit the detected results to the host computer 197, so that the results are used in display and calculation, and further, analysis, of the foregoing control output, as well as they are subjected to image display by means of corresponding display devices 3gα, 3gβ, and 3gγ. Thus, the foregoing control device controls manufacturing devices, manufacturing lines, etc.

Incidentally, in the example shown in FIG. 19, three PLCs with reference codes 2cα, 2cβ, and 2cγ are provided, but needless to say, one, or two, more PLCs may be provided, and a plurality of the host computers 197 may be provided. In the example shown in FIG. 19, control-target devices 91 and sensors 199 corresponding to the PLCs 2cβ and 2cγ are omitted for simplification of the drawing.

The PLCs 22α, 22β, and 22γ are connected to the display devices 193α, 193β, and 193γ corresponding thereto with use of connection cables 194α, 194β, and 194γ as the foregoing dedicated communication lines, respectively, so that data transmission should be carried out according to dedicated protocols α, β, and γ, that are predetermined according to manufacturers and versions of the PLCs 22α, 22β, and 22γ.

What should be noted is that the display devices 193α, 193β, and 193γ in accordance with the present aspect are provided between the PLCs 22α, 22β, and 22γ and the host computer 197, respectively, unlike in the conventional cases. The display devices 193α, 193β, and 193γ have been developed as personal-computer-applied devices that are therefore capable of easily executing communication with general-use personal computers according to a general-use protocol δ. On the other hand, the dedicated protocols α, β, and γ have been developed with respect to the corresponding to the PLCs 22α, 22β, and 22γ, respectively, to which the display devices are necessarily connected.

Therefore, the display devices 193α, 193β, and 193γ that are connected with the host computer 197 via the common communication line 6 realized by a network circuit such as an Ethernet (registered trademark), and a common protocol, such as a protocol for the TCP/IP, is used as the protocol for the above communication. Thus, protocol conversion between the protocol δ and the protocols α, β, and γ is performed by the display devices 193α, 193β, and 193γ, respectively.

The common communication line 6 is connectable, for maintenance or the like, with an external host 10 provided at a distance, for example, at manufacturers of the display devices 193α, 193β, and 193γ, respectively, via routers or public telephone lines.

In the host computer 197, a network file 62 composed of node information concerning which node is connected with what type of a display device, symbol names of control-target devices and sensors connected with the PLCs 22α, 22β, and 22γ, is formed beforehand by a setting section 61, and respective control outputs to the PLCs 22α, 22β, and 22γ are transmitted to the common communication line 6 via a common protocol interface section 64 from an application section 63, with reference to the network file 62. The control outputs are transmitted to the PLCs 22α, 22β, and 22γ via the display devices 193α, 193β, and 193γ, respectively, so as to cause the control-target apparatus 9a to be subjected to control in response to the control outputs. Further, when a control state such as a detection result of the sensor 199 is sent out from each display device, the data are returned to the application section 63 via the common protocol interface section 64, so as to be used in the display, calculation and analysis of control outputs.

Furthermore, in the host computer 197, image data of images displayed on display screens of the display devices 193α, 193β, and 193γ, conversion data for conversion between the protocols α, β, and γ and the common protocol δ, etc. are registered beforehand in a data file 65. The image data are fed to a display device necessitating the same via the common protocol interface section 64, upon maintenance such as a change to a product to be processed or an order of processing. The conversion data is fed to a display device necessitating the same via the common protocol interface section 64, upon maintenance such as a change to a PLC to be connected with the common communication line 6.

In response to this, each display device 193α, 193β, and 193γ has a dedicated protocol interface section 11 connected with the PLC, a common protocol interface section 12 connected with the host computer 197, a protocol conversion circuit 139 for mutual conversion of the protocols, a display panel 194 as the display section, an input section 15, and an image memory 19. Command data is attached to the foregoing control output or image data as will be described later, so that the common protocol interface section 12 along with the protocol conversion section 139 executes protocol conversion in the case where the command data are a control output, or writes the data into the image memory 19 in the case where the data are image data. Upon completion of updating of the image memory 19, displayed contents on the display panel 194 are updated. The image memory 19 stores, for example, invariable characters and image data such as a background screen illustrating manufacturing lines with names of control-target devices and units attached thereto. Variable data representing a control state inputted from the protocol conversion circuit 139 are synthesized with the foregoing character and image data, and an image of the same is displayed by the display panel 194.

The display devices 193α, 193β, and 193γ are integrally incorporated along with the corresponding PLCs 22α, 22β, and 22γ in an operation desk of manufacturing lines or the like, or are independently provided, so as to be used as a control panel or the like. On a front side of the display panel 194, an input section 15 such as a touch panel is provided, and data input, indirect control of a control-target device 91, etc. can be executed in response to an inputted result. The display devices 193α, 193β, and 193γ are arranged substantially identical to a generally-used personal computer as described above, and in each, a central processing unit, memories like ROM and RAM, an external memory device such as a hard disk device, a graphic controller, and a communication controller are connected mutually.

FIG. 20 is a view of an example of a data format, illustrating a data format Dδ according to the common protocol δ on the common communication line 6, and data formats Dα through Dγ according to the protocols dedicated for the PLCs 22α to 22γ, respectively. The figure exemplifies a case where the foregoing common communication line 6 is an Ethernet.

More specifically, the protocol δ on the common communication line 6 side is arranged so that normal main data following to header data D1 and D2 are divided into command data D31 and main data D32. The command data D31 represent a command such as writing or reading, and at the same time, in the present embodiment, they also indicate whether it is normal data communication between the PLCs 22α, 22β, and 22γ and the host computer, or it is a downloading operation of image data from the host computer to the image memories 19 in the display devices 193α, 193β, and 193γ.

Each of the protocols α, β, and γ on the PLCs 22α, 22β, and 22γ sides is composed of, following to a header d1, command data d2, address data d3, main data d4, and end data d5. The main data D32 are composed of address data d3 of the foregoing control-target devices 91 and sensors 199, etc., and main data d4 representing numerical values and ON/OFF information.

The common protocol interface section 12 and the protocol conversion section 139 constitute a 2-way driver that executes communication with the host computer 197 as well as communication with the PLCs 22α, 22β, and 22γ, and conducts protocol conversion of data inputted/outputted by using protocol conversion data supplied from the foregoing data file 65 at real time.

Such protocol conversion can be conducted by using conversion tables for conversion between the foregoing protocol δ common on the common communication line 6 and the respective protocols α, β, and γ dedicated for the PLCs 22α, 22β, and 22γ, conversion functions, etc., and such tables or functions are stored beforehand in the aforementioned data file 25, so as to be selected upon creation of the network file 62 for the setting of types of the display devices 193α, 193β, and 193γ that are respectively connected with the aforementioned nodes, and to be set in the protocol conversion section 139.

FIG. 21 is a timing chart for explaining downloading operation of image data from the host computer 197 or the external host 10 to the image memories 19 of the display devices 193α, 193β, and 193γ. At operation s1, the host side conducts a node search for searching which node is connected with what type of a display device, and at operation s2 the display devices 193α, 193β, and 193γ successively respond thereto, along with status information including indication of the nodes connected therewith, as well as their types.

At operation s3, image-data-transmission start data are fed from the host side, and at operation s4, acknowledge is returned from the display side. Then, at operation s5, actual transmission of image data is started. Upon completion of transmission of one packet of image data at operation s5, acknowledge is returned from the display side as shown at a step s6 in the figure. Then, upon completion of downloading of a predetermined amount of display data, that is, an entirety or a part of the image data of one display screen, image-data-transmission end data are supplied from the host side as shown by operation s7. Then, upon return of acknowledge from the display side at operation s8, transmission of image data ends.

As described above, in the present embodiment, unlike in conventional cases, display devices 193α, 193β, and 193γ that excel in computation and that have high applicability to data communication are provided between the PLCs 22α, 22β, and 22γ and the host computer 197 or the external host 10. Therefore, it is possible to transmit control outputs from the host computer 197, control state data from the PLCs 22α, 22β, and 22γ, etc. without difficulties via the display devices to the PLCs 22α, 22β, and 22γ and the host computer 197. On the other hand, since it is possible to download image data directly to the image memory 19 via the common communication line 6 from the host computer 197 or the external host 10, there is no need to carry out complex operations each time a product or a producing method is changed, such as an operation of taking a personal computer or the like for the downloading use into a manufacturing site, changing the wire connection, and downloading the data. Thus, it is possible to extremely improve the workability.

Furthermore, there is no need to temporarily stop the functions of the display devices 193α, 193β, and 193γ upon downloading, for example, to once turn the display devices 193α, 193β, and 193γ into offline states, then download data, and thereafter again turn them into online states. Moreover, since it is possible to successively download data to the display devices 193α, 193β, and 193γ without changing the wire connection as described above, a time while the line is stopped can be extremely decreased.

Furthermore, since protocol conversion between the dedicated protocols α, β, and γ and the common protocol δ is performed by the display devices 193α, 193β, and 193γ, respective programs with different protocols dedicated for the PLCs 22α, 22β, and 22γ need not be provided on the host computer 197 side, and a program can be produced with the common protocol δ. Thus, steps for producing a program can be drastically simplified.

[Ninth Aspect]

The following description of an embodiment of the present invention will explain another example of data transmitted through the common communication line 6, referring to FIGS. 22 and 23A through 23G. In the example, preset data that are set beforehand in the control unit 2 and/or the display devices 3, like initial values or application programs, are transmitted.

Figure 22:
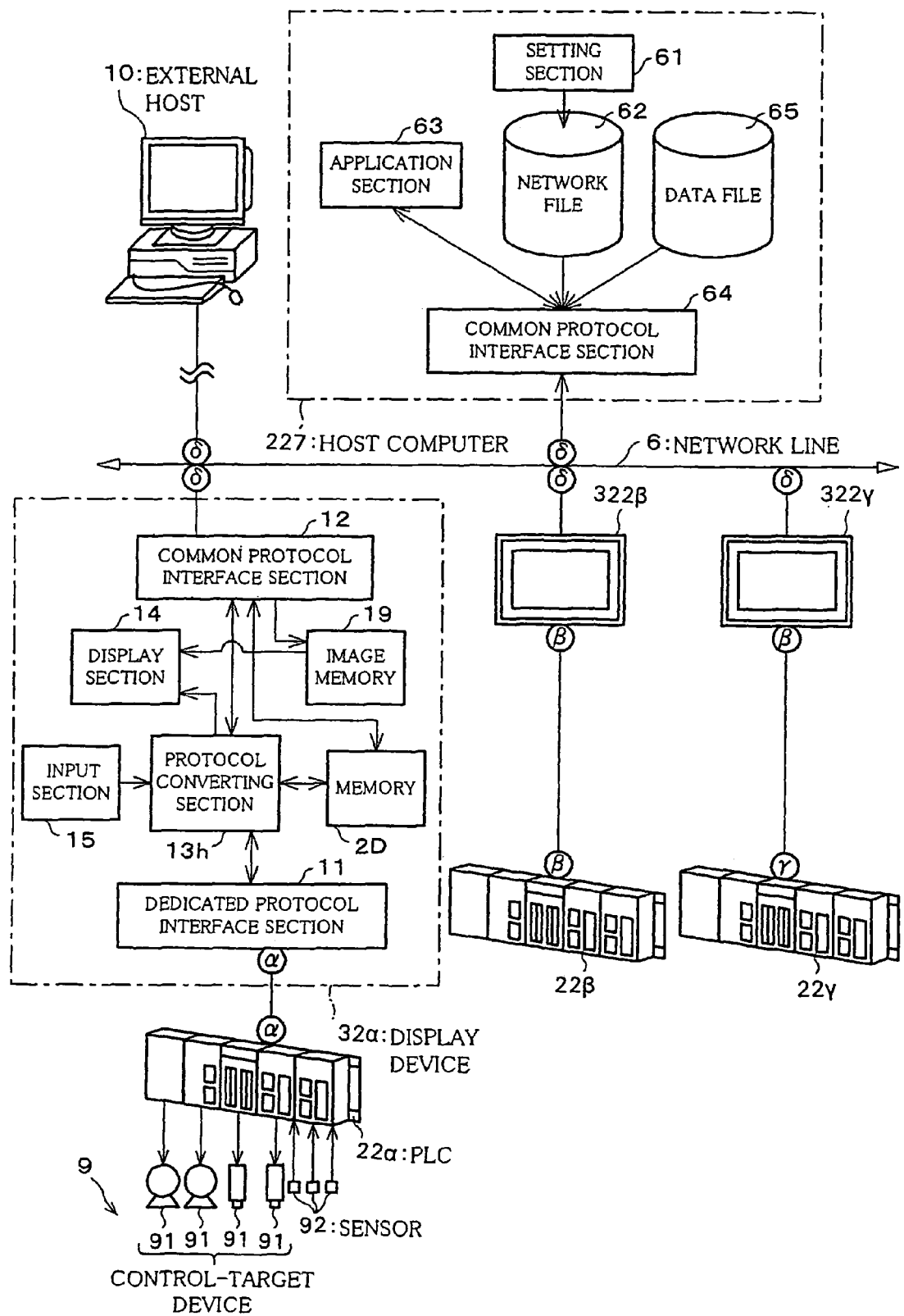
FIG. 22 is a block diagram illustrating a principal part of a control system in accordance with still another embodiment of the present invention.

FIG. 22 is a block diagram illustrating a functional arrangement of a control device in accordance with another aspect of the present invention that is similar to the arrangement shown in FIG. 19 described above, in which the members having a similar structure (function) as those in the above-mentioned aspects will be designated by the same reference numerals and their description will be omitted. In the present aspect, a memory 20 is provided in each of the display devices 322α, 322β, and 322γ. In the memory 20, like the image memory 19, data is installed by downloading the same from the host computer 227. The data thus installed are preset data such as application programs or initial values, for example, and may be preset data for the display devices 322α, 322β, and 322γ, or may be preset data for the PLCs 22α, 22β, and 22γ.

In the case where preset data is downloaded, preset data is transmitted according to the common protocol δ via the common communication line 6 from the host computer 7g, and the common protocol interface section 12 determines based on the aforementioned command data that the data are preset data to be installed, and causes the data to be stored in the memory 20. In the case where the preset data thus stored is data for the PLCs 22α, 22β, and 22γ, the display devices 322α, 322β, and 322γ output commands for stop of operations to the PLCs 22α, 22β, and 22γ, and thereafter, the preset data thus stored are successively subjected to protocol conversion by the common protocol interface section 12 and the protocol conversion section 13h, and are transmitted to the PLCs 22α, 22β, and 22γ. Upon completion of the transmission, a command for resumption of operations is outputted thereto.

Figure 23A:
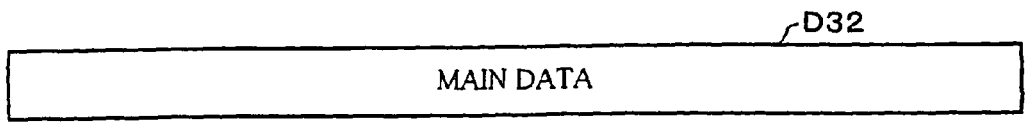
FIGS. 23A through 23G are explanatory views illustrating an example of a format of data used in the foregoing control system.
Figure 23B:
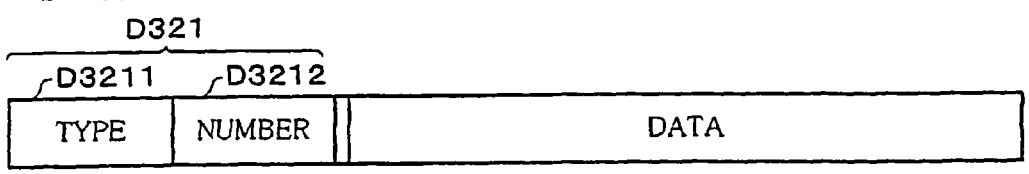

FIGS. 23A through 23G are views illustrating an example of a data format of data to be downloaded to the display devices 322α, 322β, and 322γ. FIG. 23A illustrates the main data D32 in FIG. 20, which in the present embodiment are further divided into a header D321 and data D322. The header D321 is composed of type data D3211 and number data D3212. The foregoing type data D3211 represent a rough classification regarding which type of data the data D322 following thereto are, the foregoing image data, the system setting data, or other data. The number data D3212 represent a specific classification regarding where the data D322 following thereto are ranked, among the foregoing types of data.

Figure 23C:
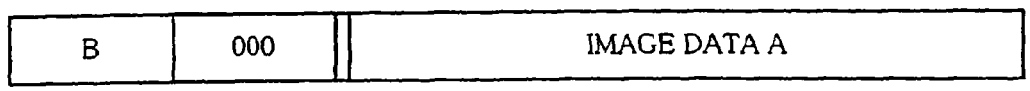
Figure 23D:
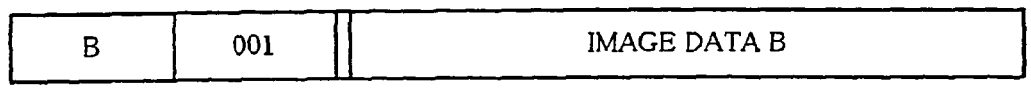

For example, in FIG. 23C, "B" as the type data D3211 indicates that data are image data, and "000" as the number data D3212 indicates that the data are image data upon processing a product A. In FIG. 23D, the data are also image data, and "001" as the number data D3212 indicates that the data are image data upon processing a product B.

Figure 23E:
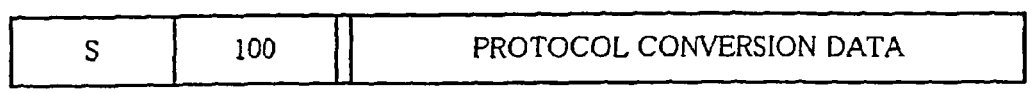
Figure 23F:
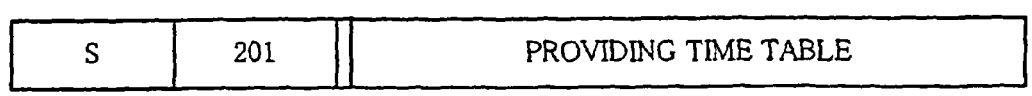
Figure 23G:
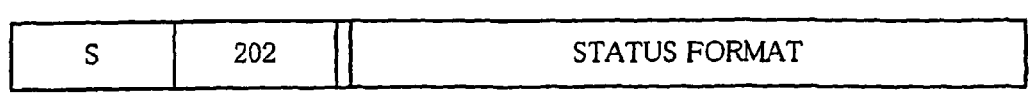
Figure 24:
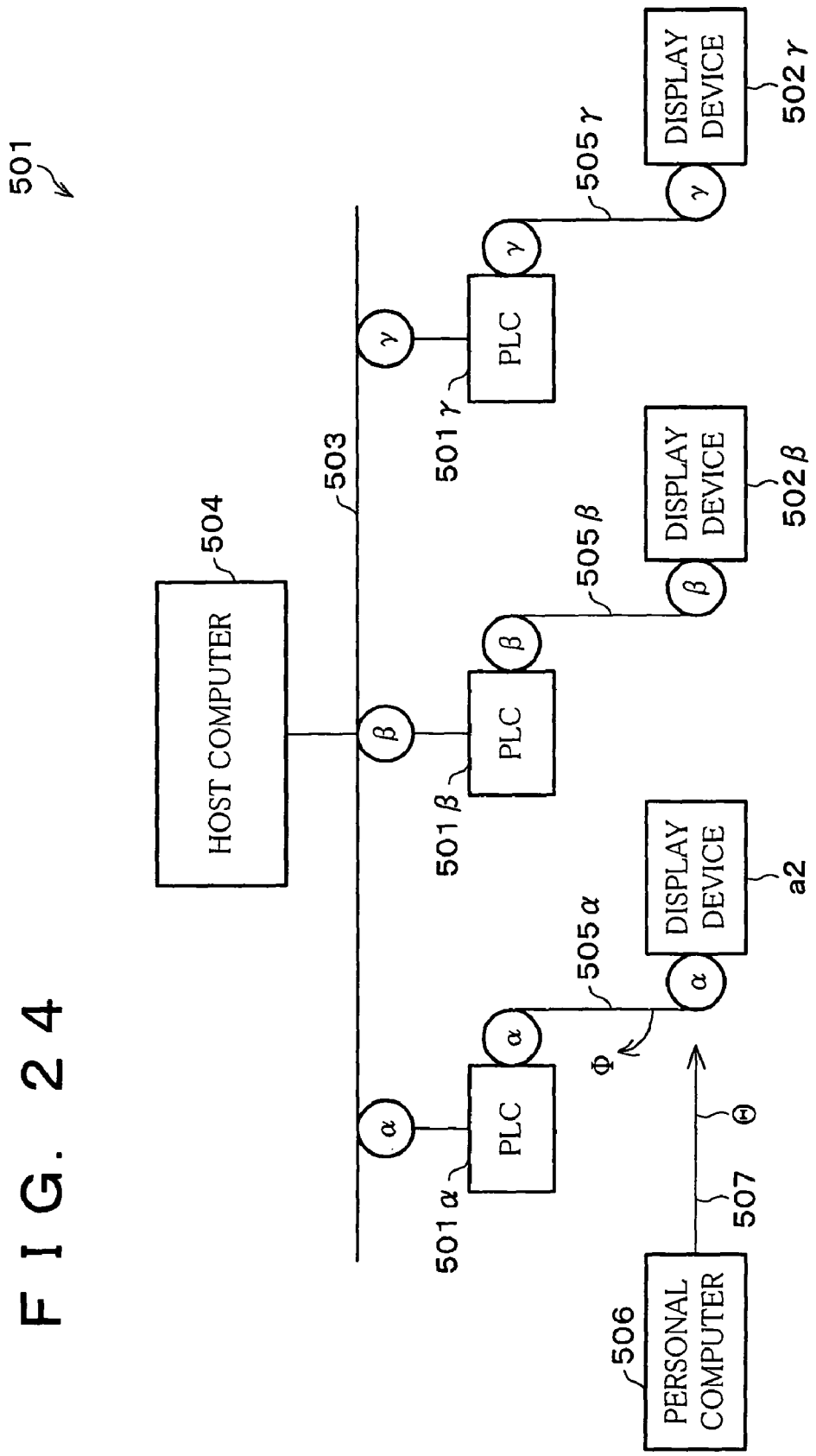
FIG. 24 is a block diagram illustrating a principal part of a typical control system of prior art.

In FIG. 23E, "S" as the type data D3211 indicates that the data are system setting data for the display devices 322α, 322β, and 322γ, and "100" as the number data D3212 indicates that the data are data for conversion between the dedicated protocols α, β, and γ and the common protocol δ. In FIG. 23F, the data are also system setting data, and "201" as the number data D3212 indicates that the data are a data providing time table that specifies timings of data transmission from the display devices 322α, 322β, and 322γ to the host computer 7g. In FIG. 23G, the data is also system setting data, and "202" as the number data D3212 indicates that the data is a status format such as a bit length, presence/absence of codes, etc. upon data transmission from the display devices 322α, 322β, and 322γ to the host computer 227.

Incidentally, such classification as above of data is performed along with the classification according to the foregoing command data D31, or alternatively, either of them may be performed.

The foregoing operation for downloading preset data can be carried out in a manner similar to that shown in FIG. 21, by transmitting preset-data-transmission start data at the operation s3 and transmitting preset-data transmission end data at the step s7 from the host side in FIG. 21.

Thus, not only the foregoing image data, but also a relatively large amount of preset data produced on the host computer 227 side with use of various application programs upon a change of a product produced or a drastic change in processing data can be downloaded to the display devices 322α, 322β, and 322γ and/or the PLCs 22α, 22β, and 22γ. In the downloading of data to the PLCs 22α, 22β, and 22γ particularly, complex works such as connection of a personal computer become unnecessary, and the workability can be extremely improved, while a time while a line is stopped can be shortened.

Furthermore, since the preset data for each of the PLCs 22α, 22β, and 22γ can be produced according to the common protocol δ, steps required for producing data can be remarkably simplified. Furthermore, in the case where many PLCs are connected to the common communication line 6 in large-scale manufacturing lines or the like, traffic increases and loads on communication also increase. Therefore, if the PLCs are directly connected to the network circuit 503 as conventionally, the foregoing downloading operation is difficult to be carried out. Conversely, it can be carried out without troubles by providing display devices with high data communication applicability as in the present invention.

Incidentally, in the foregoing descriptions, the case where protocol information is downloaded from the host computer e.g., 71, 227, data processing device 7 is explained, but instead of, or in addition to, the downloading of protocol information from the host computer, reading/writing of data with respect to a memory card may be provided so that information may be downloaded from the memory card, or information may be downloaded from a loader at appropriate timings such as production of a display screen, or alternatively, a plurality of kinds of communication protocols may be prepared in a ROM beforehand so that a necessary communication protocol may be selected. However, since new dedicated protocols are often developed, a display device is provided so that protocol in information is downloaded thereto from outside. Incidentally, in the case where a protocol dedicated for a control unit connected to a display device is invariable, it may be fixed in a ROM beforehand.

Furthermore, in the foregoing embodiment, the display devices and the host computer are connected mutually via the generally used communication protocol, but alternatively a dedicated communication protocol that is common to all the display devices but is specialized only for these display devices is applicable. Furthermore, each display device may be equipped with data input/output means like a video camera in addition to a PLC, so that various kinds of data such as video data can be transmitted via the display devices and the common communication line.

Furthermore, it is possible to arrange that a plurality of PLCs are connectable with the dedicated communication line and data transmission is carried out with one display device involved. Furthermore, shown as an example is a case where a type of a PLC to access is specified and reading/writing of data is carried out with a specific address designated for the PLC, but alternatively the following arrangement may be taken: as to address also, address display common for all the PLCs is set beforehand, and address display expressed in a manner dedicated for each PLC and a conversion table is prepared. In the latter case, it is possible to make a program without a type of PLC to access taken into consideration, whereby the applicability of the program is improved.

Incidentally, in the foregoing aspects, a control system including a display device and a control unit is taken as an example in explanation, but the present invention is not limited to this arrangement. Aspects of the present invention are widely applicable to a system including first data processing means e.g. control unit having its own dedicated communication protocol, second data processing means e.g., display device, data processing device having a common communication protocol such as a personal-computer-applied device, and data processing means e.g. display device provided between the foregoing two, making mutual transfer of data possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, in a control system in accordance with the present invention, a display device, is applied as center of data communication. This allows a control unit that had conventionally been also used in data communication now to be used exclusively for control, that is, I/O control, thereby reducing loads on the control unit. Furthermore, the display device side or the host computer side connected with the display device need not consider innumerable communication, protocols of the control units. This ensures a decrease in the number of operations software necessary for development, management, and maintenance of a control system.

Furthermore, according to a data transmission method in accordance with an aspect of the present invention, data is transmitted to a first data processing device like a PLC according to a communication protocol (dedicated protocol) dependent on the first data processing device as conventionally, while data is transmitted to a second data processing device other than the foregoing devices according to a common communication protocol that is common to all the second data processing devices. Furthermore, a communication code (program) dedicated for each device is not provided, but rather a conversion table is provided for each device, so that data to be transmitted to the first data processing device are produced at real time by using the conversion table during an operation of the system. This ensures a decrease in the number of steps of software like the foregoing control system, while it also ensures immediate response to a change of the first data processing device without stopping the system.

Furthermore, a dedicated protocol is determined in the following manner: before data transmission with the first data processing device according to a dedicated protocol, predetermined data is sent and the dedicated protocol is determined based on a response to the foregoing predetermined data from the first data processing device. This ensures reduction of time and labor in setting, as compared with the case where the user determines the dedicated protocol, thereby enabling prevention of errors in the setting.

What is claimed is:

1. A data transmission method, applied when data is transmitted between a display device and a control unit and between said display device and a data processing device, said display device being provided between said control unit and said data processing device, said control unit transmitting data according to a dedicated protocol, and said data processing device transmitting data according to a common protocol, said method comprising:

dedicated protocol communicating including transmitting data between said display device and said control unit according to the dedicated protocol; and common protocol communicating including transmitting data between said data processing device and said display device according to the common protocol, wherein in said common protocol communicating, communication is conducted between said display device and said data processing device via a common communication line.

2. A storage medium storing a program that causes a computer to function as a display device provided between a control unit and a data processing device so as to transmit data to said control unit according to a dedicated protocol and transmit data to said data processing device according to a common protocol, said storage medium storing said program that causes said computer to execute:

dedicated protocol communicating including transmitting data to said control unit according to a communication protocol specialized for said control unit;

common protocol communicating including transmitting data to said data processing device according to a communication protocol common to the data processing device that is connected with said display device; and communication protocol converting including converting the common protocol into the dedicated protocol; and as a program for execution of said communication protocol conversion, said program that causes the said computer to execute sub-steps of:

holding special information of said control unit extracted from the dedicated protocol and information that is common among said common protocols corresponding to the special information, in a form of a conversion table; and converting common information sent from said data processing device into special information of said control unit, referring to said conversion table.

3. A storage medium storing a program that causes a computer to function as a display device provided between a control unit and a data processing device so as to transmit data to said control unit according to a dedicated protocol and transmit to said data processing device according to a common protocol, said storage medium storing said program that causes said computer to execute:

dedicated protocol communicating including transmitting data with said control unit according to a communication protocol specialized for said control unit;

data sending including, prior to said dedicated protocol communicating, sending a protocol determination command from said display device to said control unit, the protocol determination command being used for selecting, from among a group of protocols, a communication protocol to be used for data transmission between said control unit and said display device possessed by itself and sending out preset data according to the selected communication protocol; and protocol determining including waiting for a response from said control unit, and determining a communication protocol to which a predetermined response is obtained, as a communication protocol to be used for the data transmission between said control unit and said display device.

4. A data transmission method as set forth in claim 1, further comprising:

communication protocol converting including converting the common protocol into the dedicated protocol, the communication protocol converting comprising:

holding special information of said control unit extracted from the dedicated protocol and information that is common among the common protocols corresponding to the special information, in a form of a conversion table; and converting common information sent from said data processing device into special information of said control unit, referring to said conversion table.

5. The data transmission method as set forth in claim 4, said communication protocol converting comprising:

holding information about a data transfer format of transfer information transmitted between said control unit and said display device, converting command data using the common information supplied from said data processing device, into the special information corresponding to the command data, by using said conversion table, and converting the converted special information into transfer information specialized for said control unit, by substituting the converted special information for undefined information portions of the data transfer format information.

6. The data transmission method as set forth in claim 5, wherein and in said dedicated protocol communicating, communication is conducted between said display device and said control unit via a dedicated communication line.

* * * * *

UNITED STATES PATENT AND TRADEMARK OFFICE
CERTIFICATE OF CORRECTION

PATENT NO. : 7,716,354 B2 Page 1 of 1
APPLICATION NO. : 11/023168
DATED : May 11, 2010
INVENTOR(S) : Nobuhiro, II et al.

It is certified that error appears in the above-identified patent and that said Letters Patent is hereby corrected as shown below:

Column 34, Line 40-43, In Claim 6, change

"wherein
and in said dedicated protocol communicating, communication is conducted between said display device and said control unit via a dedicated communication line."

to --"wherein in said dedicated protocol communicating, communication is conducted between said display device and said control unit via a dedicated communication line."--.

Signed and Sealed this

Twenty-fourth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,716,354 B2  Page 1 of 1
APPLICATION NO. : 11/023168
DATED : May 11, 2010
INVENTOR(S) : Nobuhiro, II et al.

It is certified that error appears in the above-identified patent and that said Letters Patent is hereby corrected as shown below:

Title Page item 30
Please insert Japanese Priority Application Data on the First Page, Column 1 as it appears on Column 1 below the Title:

--Apr. 27, 1998 (JP).................................10-117117
Apr. 30, 1998 (JP).................................10-120343
May 29, 1998 (JP).................................10-148801
Aug. 19, 1998 (JP).................................10-232600
Oct. 30, 1998 (JP).................................10-311039--

Signed and Sealed this

Twenty-eighth Day of September, 2010

David J. Kappos
*Director of the United States Patent and Trademark Office*